(12) United States Patent
Uesaka et al.

(10) Patent No.: US 10,910,152 B2
(45) Date of Patent: Feb. 2, 2021

(54) LAMINATED CORE MANUFACTURING APPARATUS AND LAMINATED CORE MANUFACTURING METHOD

(71) Applicant: JFE STEEL CORPORATION, Tokyo (JP)

(72) Inventors: Masanori Uesaka, Tokyo (JP); Kunihiro Senda, Tokyo (JP); Yoshihiko Oda, Tokyo (JP); Yoshihide Kamitani, Nagoya (JP); Yasuhito Shioiri, Chiba (JP)

(73) Assignee: JFE Steel Corporation, Tokyo (JP)

( * ) Notice: Subject to any disclaimer, the term of this patent is extended or adjusted under 35 U.S.C. 154(b) by 252 days.

(21) Appl. No.: 15/756,775

(22) PCT Filed: Aug. 22, 2016

(86) PCT No.: PCT/JP2016/074334
§ 371 (c)(1),
(2) Date: Mar. 1, 2018

(87) PCT Pub. No.: WO2017/038521
PCT Pub. Date: Mar. 9, 2017

(65) Prior Publication Data
US 2018/0350518 A1 Dec. 6, 2018

(30) Foreign Application Priority Data
Sep. 4, 2015 (JP) .................................. 2015-174725

(51) Int. Cl.
*H01F 41/02* (2006.01)
*B21D 28/02* (2006.01)
(Continued)

(52) U.S. Cl.
CPC .............. *H01F 41/02* (2013.01); *B21D 28/02* (2013.01); *B21D 43/00* (2013.01); *B21D 43/09* (2013.01);
(Continued)

(58) Field of Classification Search
CPC ......... B23P 19/00; B23P 19/008; B23P 19/04; B23P 21/00; B23P 21/004; B23P 23/06;
(Continued)

(56) References Cited

U.S. PATENT DOCUMENTS 5,613,390 A 3/1997 Ishikawa et al.
7,075,402 B1 7/2006 Reyal et al.
(Continued)

FOREIGN PATENT DOCUMENTS

CN 1341153 A 3/2002
CN 101438358 A 5/2009
(Continued)

OTHER PUBLICATIONS

Chinese Office Action for Chinese Application No. 2016180050141.1, with Concise Statement of Search Report, dated Oct. 18, 2018—11 pages.
(Continued)

*Primary Examiner* — Carl J Arbes
(74) *Attorney, Agent, or Firm* — RatnerPrestia

(57) ABSTRACT

A laminated core manufacturing device includes: an overlapping unit configured to overlap the plurality of laminated core materials conveyed along different conveyance routes; an edge position correction unit configured to align edge positions in a width direction of the plurality of laminated core materials between the plurality of laminated core materials and to correct shift of each edge position of the plurality of laminated core materials with respect to a standard edge position; an uplift prevention unit configured
(Continued)

to prevent uplift of the plurality of laminated core materials; and a punching unit configured to punch out the plurality of laminated core materials which are overlapped by the overlapping unit and have been subjected to a process to align the edge positions and to correct shift of the edge positions performed by the edge position correction unit, and a process to prevent the uplift performed by the uplift prevention unit.

5 Claims, 6 Drawing Sheets

(51) Int. Cl.
    *B21D 43/09*         (2006.01)
    *H02K 15/02*       (2006.01)
    *B21D 43/00*         (2006.01)
    *B26D 7/06*           (2006.01)
    *B30B 15/30*         (2006.01)

(52) U.S. Cl.
    CPC ............... *B26D 7/06* (2013.01); *B30B 15/30* (2013.01); *H02K 15/02* (2013.01)

(58) Field of Classification Search
    CPC .......... B29C 63/16; B30B 5/02; B30B 15/30; B32B 37/10; B21D 28/02; B21D 43/00; B21D 43/09; B26D 7/06; H01F 43/02; H02K 15/02
    See application file for complete search history.

(56) References Cited

U.S. PATENT DOCUMENTS

| | | |
|---|---|---|
| 2009/0280338 A1 | 11/2009 | Christian |
| 2012/0047718 A1* | 3/2012 | Ikeda ................ H01F 41/0226 29/606 |
| 2013/0180308 A1 | 7/2013 | Breen et al. |

FOREIGN PATENT DOCUMENTS

| | | | |
|---|---|---|---|
| CN | 202779203 | U | 3/2013 |
| CN | 204321011 | U | 5/2015 |
| EP | 1043086 | A2 | 10/2000 |
| EP | 1399137 | B1 * | 11/2012 |
| GB | 913725 | A | 12/1962 |
| JP | 6015412 | U | 2/1985 |
| JP | 10193009 | A | 7/1998 |
| JP | 2001016832 | A | 1/2001 |
| JP | 2003153503 | A | 5/2003 |
| JP | 2003189515 | A | 7/2003 |
| JP | 2003264962 | A | 9/2003 |
| JP | 2005191033 | A | 7/2005 |
| JP | 2005332976 | A | 12/2005 |
| JP | 2007311652 | A | 11/2007 |
| JP | 2010105760 | A | 5/2010 |
| JP | 4581228 | B2 | 11/2010 |
| JP | 2012050989 | A | 3/2012 |
| JP | 2012240067 | A | 12/2012 |
| JP | 5630150 | B2 | 11/2014 |
| TW | 181392 | | 7/1980 |
| WO | 2012155232 | A1 | 11/2012 |

OTHER PUBLICATIONS

International Search Report and Written Opinion for International Application No. PCT/JP2016/074334, dated Sep. 27, 2016, 4 pages.
Taiwanese Search Report for Taiwanese Application No. 105128124, dated Jul. 17, 2017, 1 page.
Extended European Search Report for European Application No. 16 841 553.7, dated Feb. 25, 2019, 8 pages.
Korean Office Action for Korean Application No. 10-2018-7005234, dated May 31, 2019, with Concise Statement of Relevance of Office Action, 5 pages.

* cited by examiner

LAMINATED CORE MANUFACTURING APPARATUS AND LAMINATED CORE MANUFACTURING METHOD

CROSS REFERENCE TO RELATED APPLICATIONS

This is the U.S. National Phase application of PCT/JP2016/074334, filed Aug. 22, 2016, which claims priority to Japanese Patent Application No. 2015-174725, filed Sep. 4, 2015, the disclosures of these applications being incorporated herein by reference in their entireties for all purposes.

TECHNICAL FIELD OF THE INVENTION

The present invention relates to a laminated core manufacturing device and a laminated core manufacturing method.

BACKGROUND OF THE INVENTION

In the related art, a steel sheet having a high magnetic permeability such as an electrical steel sheet is used as a material for manufacturing a laminated core, that is, a laminated core material. Generally, in manufacturing a laminated core, a thin steel sheet having a high magnetic permeability (for example, an electrical steel sheet with a reduced sheet thickness), as a laminated core material, is fed into a pressing machine and punched out into a core shape by the pressing machine. The core-shaped steel sheet structure punched out by the pressing machine in this manner (hereinafter referred to as a "punched out body") is laminated over one another in a thickness direction thereof to be integrated together. Accordingly, a laminated core used for an electric motor core and the like is manufactured.

In recent years, the field of electric motors is holding high expectations for high efficiency in performance of an electric motor (rotational motion) due to demands for energy saving. In an electrical steel sheet or a laminated core material, a material with a thin sheet thickness is required for purpose of reducing eddy current loss of a laminated core generated when rotating an electric motor at high speed. Such a requirement leads to an increase in demand for an electrical steel sheet having a sheet thickness of 0.35 mm or less. A future aim to further improve efficiency of an electric motor using a laminated core causes a trend to further reduce an electrical steel sheet in sheet thickness. However, further reduction in sheet thickness of an electrical steel sheet increases the number of laminated electrical steel sheets required for manufacturing a laminated core. Such an increase in the number of laminated electrical steel sheets prolongs the time required for punching out an electrical steel sheet as a laminated core material, which results in a decrease in production efficiency of a laminated core.

As a solution to these problems, such a technique has been proposed in the related art that a plurality of steel sheets is punched out simultaneously to enhance efficiency. For example, Patent Literature 1 discloses a method for manufacturing an electric motor core. Herein, before punching out a plurality of electrical steel sheets by a pressing machine, those parts in the electrical steel sheets that are not used for the electric motor core are fixed to each other so as to adhere the plurality of electrical steel sheets to each other. In a method disclosed in Patent Literature 2, an adhesive layer is formed between a plurality of electrical steel sheets so as not to surround a non-adhesive region, and the formed adhesive layer partially bonds the plurality of electrical steel sheets.

Patent Literature 3 discloses a method of applying an inorganic adhesive containing alumina or silica as a main component to a plurality of electrical steel sheets so as to bond the plurality of electrical steel sheets. Patent Literature 4 discloses a method of bonding a plurality of electrical steel sheets with an adhesive layer of an organic resin having a glass transition temperature or softening temperature of 50° C. or higher.

In a method disclosed in Patent Literature 5, a plurality of electrical steel sheets is bonded with an adhesive film interposed between the plurality of electrical steel sheets so as to make a multi-layered laminated steel sheet, and this multi-layered laminated steel sheet is punched out by a pressing machine, thereby manufacturing a laminated core. In a method disclosed in Patent Literature 6, two pieces of steel sheets each having different thicknesses at both ends in a direction perpendicular to a rolling direction are overlapped in such a manner that the end with the larger thickness lies adjacent to the end with the smaller thickness, and the two steel sheets are simultaneously punched out by a pressing machine to form a punched out body (a core member) having a predetermined shape, and the punched out body is sequentially laminated in such a manner that each rolling direction is brought into line, thereby producing a laminated core.

However, punching out steel sheets may lead to meandering of the steel sheets, which causes a trouble and decreases efficiency. In order to solve this problem, Patent Literature 7 discloses a side guide device configured to hold ends in a width direction of a metallic band that travels through a process line so as to prevent meandering of the metallic band. In a and a method disclosed in Patent Literature 8, an amount of meandering which is an amount of positional variation in a width direction of steel sheets is detected in a process line, and a steering roller is inclined in a horizontal plane with respect to a traveling direction of the steel sheets based on the detected amount of meandering of the steel sheets, thereby correcting the meandering of the steel sheets.

CITATION LIST

Patent Literature

Patent Literature 1: JP 2003-153503 A
Patent Literature 2: JP 2003-264962 A
Patent Literature 3: JP 2005-332976 A
Patent Literature 4: JP 4581228 B2
Patent Literature 5: JP 2005-191033 A
Patent Literature 6: JP 2003-189515 A
Patent Literature 7: JP 60-15412 Y
Patent Literature 8: JP 2012-240067 A

SUMMARY OF THE INVENTION

However, in the conventional techniques disclosed in Patent Literatures 1 to 6, a plurality of laminated core materials that is overlapped to be simultaneously punched out by a pressing machine may shift in a direction perpendicular to a rolling direction (that is, in a width direction of the laminated core materials) before being fixed with an adhesive layer or caulking and the like. Such shift may cause the laminated core materials to collide against an inner wall of a die in the pressing machine or may cause the laminated core materials to fall off the die in the pressing machine.

Particularly, in overlapping a plurality of laminated core materials and continuously punching out the same to manufacture a laminated core, when each thickness of the plurality of laminated core materials is inclined in the width direction of the laminated core materials as exemplified in Patent Literature 6, the following problem may occur. That is, when overlapping the plurality of laminated core materials, the plurality of overlapped laminated core materials shifts to the opposite directions in the width direction of the laminated core materials due to their own weights or a load received from a pinch roller, which is a serious problem. This problem may lead to such troubles that the laminated core materials collide against an inner wall of a die or the laminated core materials fall off the die as described above (hereinafter referred to as the troubles due to shift in the width direction of the laminated core materials).

In order to solve such troubles due to shift in the width direction of the laminated core materials, it seems efficient to correct meandering of the plurality of laminated core materials before overlapping the laminated core materials, using the side guide disclosed in Patent Literature 7 or the steering roller disclosed in Patent Literature 8. However, in the side guide device disclosed in Patent Literature 7, the laminated core materials that come into contact with a side guide may be lifted up, which causes a trouble that the laminated core materials clog the die. Furthermore, in the meandering correction technique disclosed in Patent Literature 8, it is required to install the steering roller configured to correct meandering and a detection device configured to detect positions of ends (hereinafter, appropriately referred to as edges) in the width direction of the laminated core materials (hereinafter appropriately referred to as edge positions) in accordance with the number of overlapped laminated core materials. Installation of such devices increases installation costs and running costs of the devices and causes troublesome maintenance of the devices.

Aspects of the present invention have been made in light of the aforementioned situations, and an object of aspects of the present invention is to provide a laminated core manufacturing device and a laminated core manufacturing method capable of suppressing, to the extent possible, shift in edge positions and uplift of a plurality of laminated core materials overlapped and punched out to manufacture a laminated core.

As a result of intensive studies to solve the aforementioned problems, the present inventors have found that a plurality of laminated core materials overlapped with edge positions being aligned can be stably fed into a punching die by using the following mechanisms: a mechanism to correct meandering (variation of the edge positions in a width direction) while aligning the edge positions of the plurality of overlapped laminated core materials; and a mechanism to prevent uplift, thereby developing aspects of the present invention. To solve the problem and achieve the object, a laminated core manufacturing device for manufacturing at least a punched out body of a plurality of laminated core materials used for manufacturing a laminated core according to aspects of the present invention includes: an overlapping unit configured to overlap the plurality of laminated core materials conveyed along different conveyance routes; an edge position correction unit configured to align edge positions in a width direction of the plurality of laminated core materials between the plurality of laminated core materials and to correct shift of each edge position of the plurality of laminated core materials with respect to a standard edge position which is a reference of each edge position in the width direction; an uplift prevention unit configured to prevent uplift of the plurality of laminated core materials in which the edge positions are aligned and shift of the edge positions is corrected by the edge position correction unit; and a punching unit configured to punch out the plurality of laminated core materials which are overlapped by the overlapping unit and have been subjected to a process to align the edge positions and to correct shift of the edge positions performed by the edge position correction unit, and a process to prevent the uplift performed by the uplift prevention unit, so as to obtain the punched out body.

Moreover, in the laminated core manufacturing device according to aspects of the present invention, the edge position correction unit is installed just before an inlet of the overlapping unit or just behind an outlet of the overlapping unit, or installed just before the inlet and just behind the outlet of the overlapping unit.

Moreover, in the laminated core manufacturing device according to aspects of the present invention, the edge position correction unit includes: a pair of side guide rollers facing each other in the width direction of the plurality of laminated core materials; and a pair of springs configured to generate elastic force to bias the pair of side guide rollers in a facing direction when the pair of side guide rollers separates from each other and exceeds a reference interval between the pair of side guide rollers, wherein the pair of side guide rollers sandwiches the plurality of laminated core materials in the width direction by the elastic force of the pair of springs so as to align the edge positions and to correct shift of the edge positions.

Moreover, a laminated core manufacturing method for manufacturing at least a punched out body of a plurality of laminated core materials used for manufacturing a laminated core according to aspects of the present invention includes: an overlapping step of overlapping the plurality of laminated core materials conveyed along different conveyance routes; an edge position correction step of aligning edge positions in a width direction of the plurality of laminated core materials between the plurality of laminated core materials and to correct shift of each edge position of the plurality of laminated core materials with respect to a standard edge position which is a reference of each edge position in the width direction; an uplift prevention step of preventing uplift of the plurality of laminated core materials in which the edge positions are aligned and shift of the edge positions is corrected by the edge position correction step;

and a punching step of punching out the plurality of laminated core materials which have been overlapped by the overlapping step, and subjected to a process to align the edge positions and to correct shift of the edge positions in the edge position correction step, and a process to prevent the uplift in the uplift prevention step, so as to obtain the punched out body.

According to aspects of the present invention, it is possible to suppress, to the extent possible, shift in edge positions and uplift of a plurality of laminated core materials overlapped and punched out to manufacture a laminated core.

DETAILED DESCRIPTION OF EMBODIMENTS OF THE INVENTION

Figure 1:
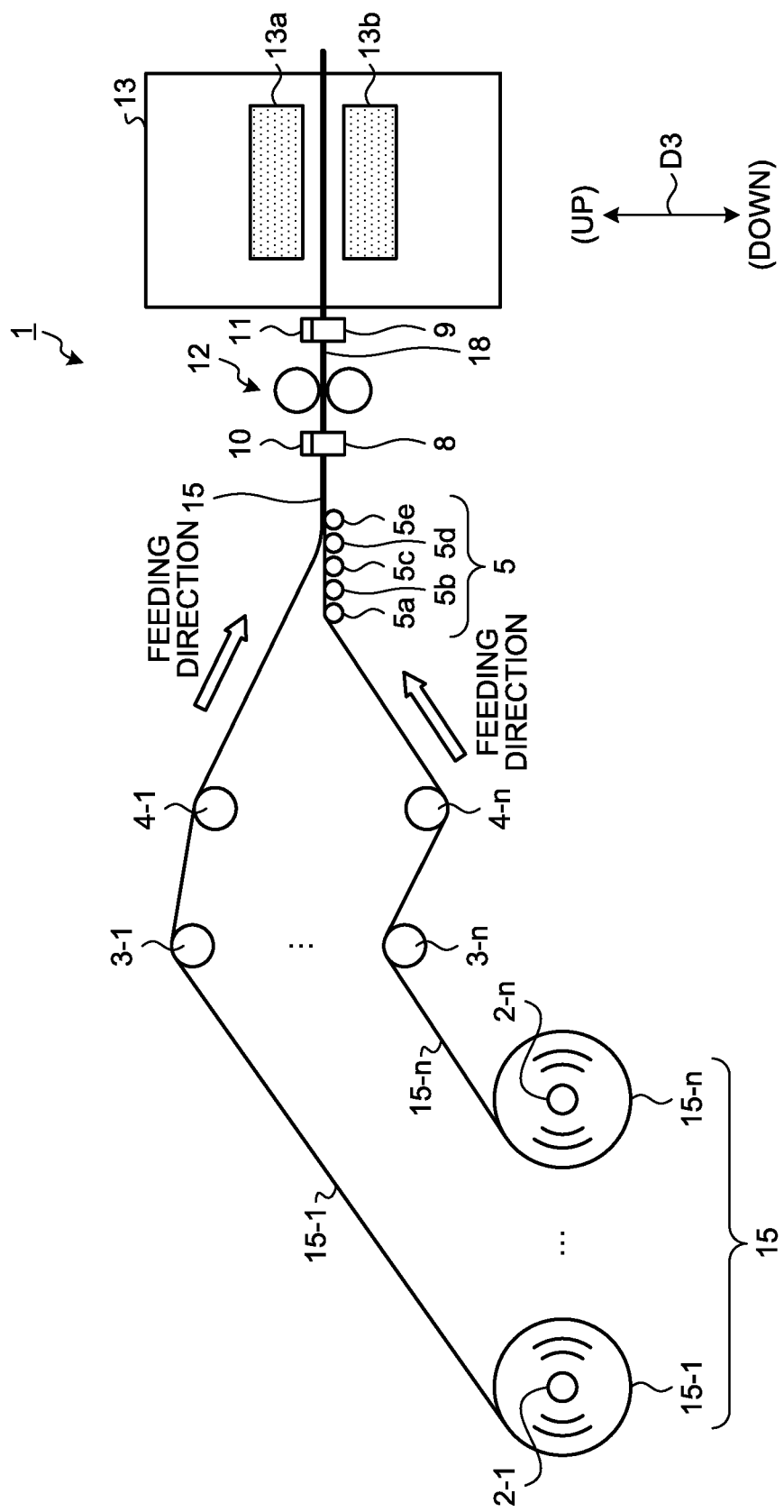
FIG. 1 is a view illustrating an exemplary structure of a laminated core manufacturing device according to an embodiment of the present invention.

Hereinafter, a preferred embodiment of a laminated core manufacturing device and a laminated core manufacturing method according to aspects of the present invention will be described in detail with reference to the accompanying drawings. It should be noted that the present invention is not limited by this embodiment. It should also be noted that the drawings are schematic views and that dimensional relationships, ratios, and the like of components may differ from the actual ones. The dimensional relationships and ratios of the components may also differ between the drawings. In each drawing, the same components are denoted with the same reference numerals.

(Structure of Laminated Core Manufacturing Device)

Figure 2:
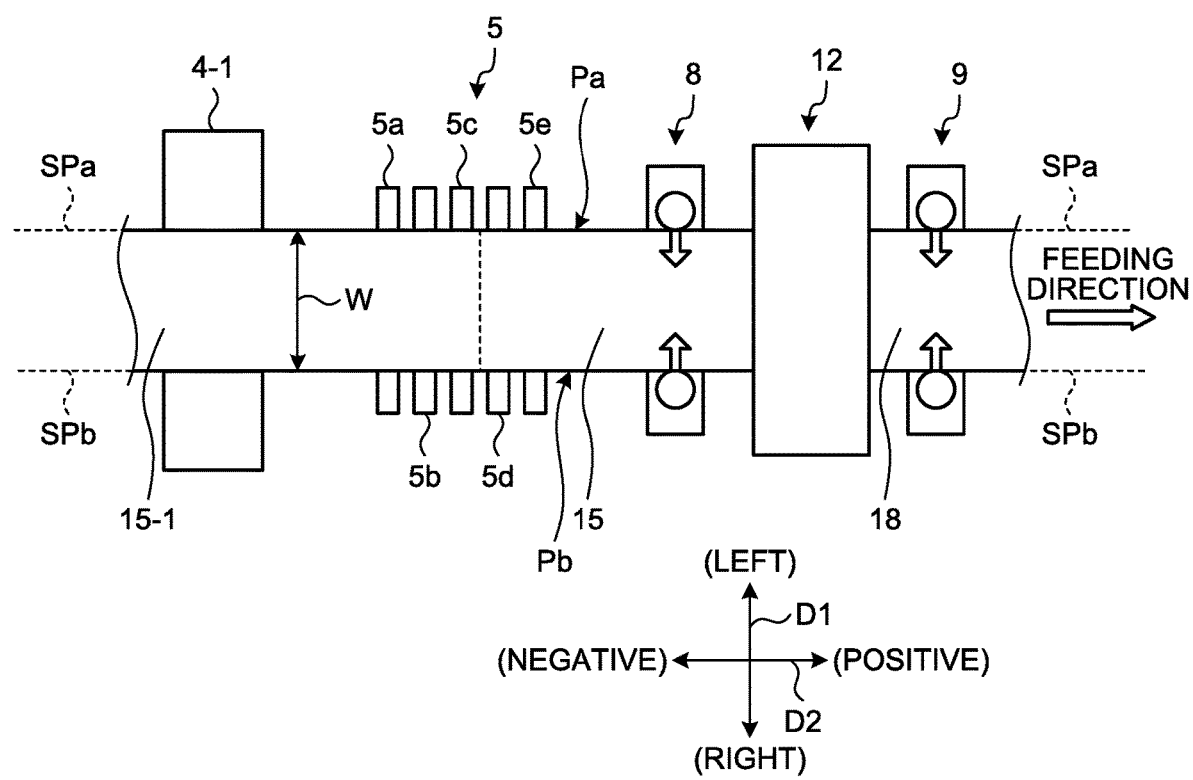
FIG. 2 is a view illustrating an exemplary structure of main parts in the laminated core manufacturing device according to the embodiment of the present invention.

First, a structure of a laminated core manufacturing device according to the embodiment of the present invention will be described. FIG. 1 is a view illustrating an exemplary structure of the laminated core manufacturing device according to the embodiment of the present invention. FIG. 2 is a view illustrating an exemplary structure of main parts in the laminated core manufacturing device according to the embodiment of the present invention. As illustrated in FIGS. 1 and 2, a laminated core manufacturing device 1 according to the embodiment of the present invention includes a plurality of discharging units 2-1 to 2-$n$ that discharges n-pieces (n represents an integer of 2 or more, the same applies hereinafter) of steel sheets 15-1 to 15-$n$ as laminated core materials (hereinafter appropriately abbreviated as a "plurality of steel sheets 15"); and a plurality of feed rollers 3-1 to 3-$n$, and 4-1 to 4-$n$ that feeds the plurality of steel sheets 15 along corresponding conveyance routes. The laminated core manufacturing device 1 further includes a feed roller group 5 that overlaps the plurality of steel sheets 15 while conveying the same; edge position correction units 8 and 9 that align edge positions and correct shift of the edge positions of steel sheets 15; uplift prevention units 10 and 11 that prevent uplift of the plurality of steel sheets 15; a pinch roller 12 that overlaps the plurality of steel sheets 15; and a pressing machine 13 that punches out the plurality of overlapped steel sheets 15.

FIG. 2 illustrates the structure from the feed roller 4-1 to the edge position correction unit 9 in the laminated core manufacturing device 1 as viewed from above (from the upper side in a thickness direction D3 of the plurality of steel sheets 15). The uplift prevention units 10 and 11 are not illustrated in FIG. 2 in order to easily describe a process of aligning the edge positions and correcting shift of the edge positions of the plurality of steel sheets 15 by the edge position correction units 8 and 9 (hereinafter appropriately referred to as an edge aligning process).

The discharging units 2-1 to 2-$n$ are equipment configured to discharge the plurality of steel sheets 15. Specifically, each of the discharging units 2-1 to 2-$n$ includes a payoff reel and the like, being installed at an end of an inlet in the laminated core manufacturing device 1. The discharging units 2-1 to 2-$n$ respectively receive n-pieces of steel sheets 15-1 to 15-$n$ (or n-number of steel sheets 15 when they have a coil-like shape) as a plurality of laminated core materials used for manufacturing a laminated core, and then respectively and sequentially discharge the steel sheets 15-1 to 15-$n$ to the corresponding conveyance routes.

In this embodiment, the n-pieces of steel sheets 15-1 to 15-$n$ are all thin plate-like electrical steel sheets having high magnetic permeability (non-oriented electrical steel sheets and the like). As illustrated in FIG. 1, these steel sheets 15-1 to 15-$n$ are respectively received by the discharging units 2-1 to 2-$n$ in a coiled state.

The feed rollers 3-1 to 3-$n$, and 4-1 to 4-$n$ are equipment configured to feed the plurality of steel sheets 15 from upstream of the conveyance routes to downstream thereof. Specifically, as illustrated in FIG. 1, the feed rollers 3-1 to 3-$n$ are both installed in the subsequent stage of the discharging units 2-1 to 2-$n$, and the feed rollers 4-1 to 4-$n$ are both installed in the subsequent stage of these feed rollers 3-1 to 3-$n$. The feed rollers 3-1 to 3-$n$ respectively and sequentially feed the steel sheets 15-1 to 15-$n$ discharged from the discharging units 2-1 to 2-$n$ to the feed rollers 4-1 to 4-$n$ by the corresponding conveyance routes. The feed rollers 4-1 to 4-$n$ respectively and sequentially feed the steel sheets 15-1 to 15-$n$ fed from the feed rollers 3-1 to 3-$n$ in the preceding stage to the feed roller group 5 by the corresponding conveyance routes.

The feed roller group 5 is equipment configured to overlap the plurality of steel sheets 15 while conveying the same from upstream of the conveyance routes to downstream thereof. Specifically, as illustrated in FIG. 1, the feed roller group 5 includes a plurality of (five in this embodiment) feed rollers 5a to 5e arranged along the conveyance routes of the plurality of steel sheets 15. The number of feed rollers disposed in the feed roller group 5 is not particularly limited to five, but may be any number as long as it is necessary for conveying and overlapping the plurality of steel sheets 15.

In such a feed roller group 5, at least one of the feed rollers 5a to 5e receives the steel sheets 15-1 to 15-$n$ fed from the feed rollers 4-1 to 4-$n$ along feeding directions (see thick arrows in FIG. 1) by the corresponding conveyance routes. The feed roller group 5 sequentially feeds the steel sheets 15-1 to 15-$n$ from upstream of the conveyance routes to downstream thereof by the feed rollers 5a to 5e, and simultaneously overlaps the steel sheets 15-1 to 15-$n$ in the thickness direction D3 at a position corresponding to any one of the feed rollers 5a to 5e. In the plurality of steel sheets 15 herein, the steel sheets 15-1 to 15-$n$ are overlapped with each other on the feed roller group 5 under their own weights. The feed roller group 5 sequentially feeds the plurality of steel sheets 15 overlapped in this manner to the edge position correction unit 8.

Accordingly, the edge position correction units 8 and 9 align the edge positions in the width direction D1 of the plurality of laminated core materials between the laminated core materials, and corrects shift of the edge positions of the plurality of laminated core materials with respect to the standard edge positions SPa and SPb in the width direction D1. In this embodiment, as illustrated in FIGS. 1 and 2, the edge position correction units 8 and 9 are installed in the preceding stage of the pressing machine 13, respectively being installed at a position just before an inlet and a position just behind an outlet of the pinch roller 12 that presses and overlaps the plurality of steel sheets 15. In other words, as illustrated in FIGS. 1 and 2, between the edge position correction units 8 and 9 and the pinch roller 12, there is no equipment that affects the conveyance of the laminated core materials such as feed rollers.

At the position just before the inlet of the pinch roller 12, the edge position correction unit 8 sandwiches the plurality of steel sheets 15 conveyed from the feed roller group 5 toward the pinch roller 12 from both right and left sides in the width direction D1, using a pair of rotative rolling bodies that receives action of elastic force of the after-mentioned springs. Accordingly, the edge position correction unit 8 aligns the edge positions of the plurality of steel sheets 15 between the steel sheets 15-1 to 15-$n$ in such a manner that a maximum width between right and left edge positions Pa and Pb in the width direction D1 of the plurality of steel sheets 15 becomes similar (desirably, becomes equivalent) to each sheet width W of the plurality of steel sheets 15 (for example, the width W of the steel sheet 15-1).

At the same time, from both right and left sides in the width direction D1, the edge position correction unit 8 corrects meandering of the plurality of steel sheets 15 when the plurality of steel sheets 15 is conveyed from the feed roller group 5 toward the pinch roller 12. Accordingly, the edge position correction unit 8 corrects shift of the edge positions of the plurality of steel sheets 15 with respect to the standard edge positions SPa and SPb in the width direction D1 illustrated in FIG. 2. In other words, the edge position correction unit 8 reduces an amount of shift from the standard edge position SPa in regard to the left edge position Pa (each left edge position of the overlapped steel sheets 15-1 to 15-$n$) in the width direction D1 of the plurality of steel sheets 15. Furthermore, the edge position correction unit 8 reduces an amount of shift from the standard edge position SPb in regard to the right edge position Pb (each right edge position of the overlapped steel sheets 15-1 to 15-$n$) in the width direction D1 of the plurality of steel sheets 15.

At the position just behind the outlet of the pinch roller 12, the edge position correction unit 9 sandwiches an overlapped body 18 of the plurality of steel sheets 15 conveyed from the pinch roller 12 toward the pressing machine 13 from both right and left sides in the width direction D1, using a pair of rotative rolling bodies that receives action of elastic force of the after-mentioned springs. Accordingly, the edge position correction unit 9 aligns the edge positions of the overlapped body 18 between the steel sheets 15-1 to 15-$n$ in such a manner that the maximum width between the right and left edge positions Pa and Pb in the width direction D1 of the overlapped body 18 becomes similar (desirably, becomes equivalent) to each sheet width W of the plurality of steel sheets 15-1 to 15-$n$.

At the same time, from both right and left sides in the width direction D1, the edge position correction unit 9 corrects meandering of the overlapped body 18 when the overlapped body 18 of the plurality of steel sheets 15 is conveyed from the pinch roller 12 toward the dies (the upper die 13$a$ and lower die 13$b$) of the pressing machine 13. Accordingly, the edge position correction unit 9 corrects shift of the edge positions of the overlapped body 18 with respect to the standard edge positions SPa and SPb in the width direction D1 illustrated in FIG. 2. In other words, the edge position correction unit 9 reduces an amount of shift from the standard edge position SPa in regard to the left edge position Pa (each left edge position of the overlapped steel sheets 15-1 to 15-$n$) in the width direction D1 of the overlapped body 18. Furthermore, the edge position correction unit 9 reduces an amount of shift from the standard edge position SPb in regard to the right edge position Pb (each right edge position of the overlapped steel sheets 15-1 to 15-$n$) in the width direction D1 of the overlapped body 18.

Herein, the standard edge positions SPa and SPb are references of the right and left edges in the width direction D1 of the steel sheets 15-1 to 15-$n$, and are common between the steel sheets 15-1 to 15-$n$. Such standard edge positions SPa and SPb are set, for example, in accordance with positions and the like of the upper die 13$a$ and lower die 13$b$ so as to match with optimal positions as the edge positions of the plurality of steel sheets 15 that is to be conveyed between the upper die 13$a$ and the lower die 13$b$ of the pressing machine 13.

The uplift prevention units 10 and 11 are structures configured to prevent uplift of the plurality of laminated core materials in which the edge positions are aligned and shift of the edge positions is corrected by the edge position correction units 8 and 9. Specifically, as illustrated in FIG. 1, the uplift prevention unit 10 is provided on an upper part of the edge position correction unit 8 positioned just before the inlet of the pinch roller 12. The uplift prevention unit 10 prevents uplift of the plurality of steel sheets 15 in which the edge positions are aligned and shift of the edge positions is corrected by the edge position correction unit 8. In other words, the uplift prevention unit 10 prevents uplift of each edge of the steel sheets 15-1 to 15-$n$ overlapped in the thickness direction D3 due to the action of the edge position correction unit 8.

As illustrated in FIG. 1, the uplift prevention unit 11 is provided on an upper part of the edge position correction unit 9 positioned just behind the outlet of the pinch roller 12. The uplift prevention unit 11 prevents uplift of the plurality of steel sheets 15 (particularly, the overlapped body 18) in which the edge positions are aligned and shift of the edge positions is corrected by the edge position correction unit 9. In other words, the uplift prevention unit 11 prevents uplift of each edge of the steel sheets 15-1 to 15-$n$ overlapped in the thickness direction D3, as the overlapped body 18, due to the action of the edge position correction unit 9.

The pinch roller 12 functions as a overlapping unit configured to overlap the plurality of steel sheets 15 as the plurality of laminated core materials conveyed along different conveyance routes. Specifically, as illustrated in FIG. 1, the pinch roller 12 includes a pair of upper and lower rotative rollers and the like, and as illustrated in FIGS. 1 and 2, the pinch roller 12 is installed at a position in the preceding stage of the pressing machine 13, in this embodiment, at a position between the edge position correction units 8 and 9. The pinch roller 12 sandwiches the plurality of steel sheets 15 conveyed through the edge position correction unit 8 from above and below, thereby overlapping the plurality of steel sheets 15 while pressing the same in the thickness direction D3. In this manner, the pinch roller 12 obtains the overlapped body 18 of the plurality of steel sheets 15.

In this embodiment, the overlapped body 18 is a laminated structure in which the steel sheets 15-1 to 15-n are overlapped in the thickness direction D3 and is prevented from being lifted by the uplift prevention unit 10 and in which the edge positions are aligned and shift of the edge positions is corrected by the edge position correction unit 8. As described above, the pinch rollers 12 sequentially feeds the overlapped body 18 toward the edge position correction unit 9 disposed close to the pressing machine 13 while overlapping the plurality of steel sheets 15.

The pressing machine 13 functions as a punching unit configured to punch out the plurality of steel sheets 15 overlapped by the pinch roller 12 (that is, the overlapped body 18) so as to obtain a punched out body of the laminated core materials. Specifically, as illustrated in FIG. 1, the pressing machine 13 is provided with the upper die 13a and the lower die 13b as dies for punching, being installed at a position in the subsequent stage of the pinch roller 12, particularly, in the subsequent stage of the edge position correction unit 9. The pressing machine 13 receives the overlapped body 18 into the dies, that is, between the upper die 13a and the lower die 13b, and sandwiches the received overlapped body 18 by the upper die 13a and the lower die 13b so as to restrain the same. Next, the pressing machine 13 simultaneously punches out the overlapped body 18 in the thickness direction D3, using the upper die 13a and the lower die 13b. The overlapped body 18 punched out by the pressing machine 13 in this manner is the steel sheets 15-1 to 15-n overlapped by the pinch roller 12. The plurality of steel sheets 15 herein is subjected to the following processes: alignment of the edge positions and correction of shift of the edge positions performed by the edge position correction units 8 and 9 (edge aligning process); and prevention of uplift performed by the uplift prevention units 10 and 11.

By the aforementioned punching process, the pressing machine 13 obtains the punched out body of the laminated core materials punched out into a target core shape from the steel sheets 15-1 to 15-n that forms the overlapped body 18. Every time the overlapped body 18 is received into the dies by the pinch roller 12, the pressing machine 13 continuously punches out the punched out body into the target core shape from the steel sheets 15-1 to 15-n that forms the received overlapped body 18, so as to obtain a plurality of punched bodies having the target core shape. The pressing machine 13 laminates the plurality of punched bodies obtained in this manner so that rolling directions of the steel sheets 15-1 to 15-n, which are the materials, align in the same direction. The pressing machine 13 then integrates the punched bodies by action of the upper die 13a and the lower die 13b, so as to manufacturing a desired laminated core.

In the embodiment of the present invention, the width direction D1 is a direction in which each sheet width of the plurality of steel sheets 15 as the laminated core materials stretches. The longitudinal direction D2 is a direction in which the plurality of steel sheets 15 stretches longitudinally, that is, a rolling direction of each of the steel sheets 15-1 to 15-n. The steel sheets 15-1 to 15-n are conveyed in such a longitudinal direction D2. The thickness direction D3 is a direction in which each sheet thickness of the plurality of steel sheets 15 stretches. Particularly, when the plurality of steel sheets 15 such as the aforementioned overlapped body 18 is in an overlapped state, the thickness direction D3 is the same as a direction in which of the plurality of steel sheets 15 is overlapped (lamination direction). The width direction D1, the longitudinal direction D2, and the thickness direction D3 are perpendicular to each other.

Furthermore, the right side in the width direction D1 is the right side in a direction of conveyance of the plurality of steel sheets 15 (feeding direction), and the left side in the width direction D1 is the left side in the direction of conveyance. The positive direction in the longitudinal direction D2 is a direction in which the plurality of steel sheets 15 advances (travels) as being conveyed, and the negative direction in the longitudinal direction D2 is the opposite direction of this positive direction. The upper side in the thickness direction D3 is a direction heading vertically upward, and the lower side in the thickness direction D3 is a direction heading vertically downward.

(Structure of Edge Position Correction Unit)

Figure 3:
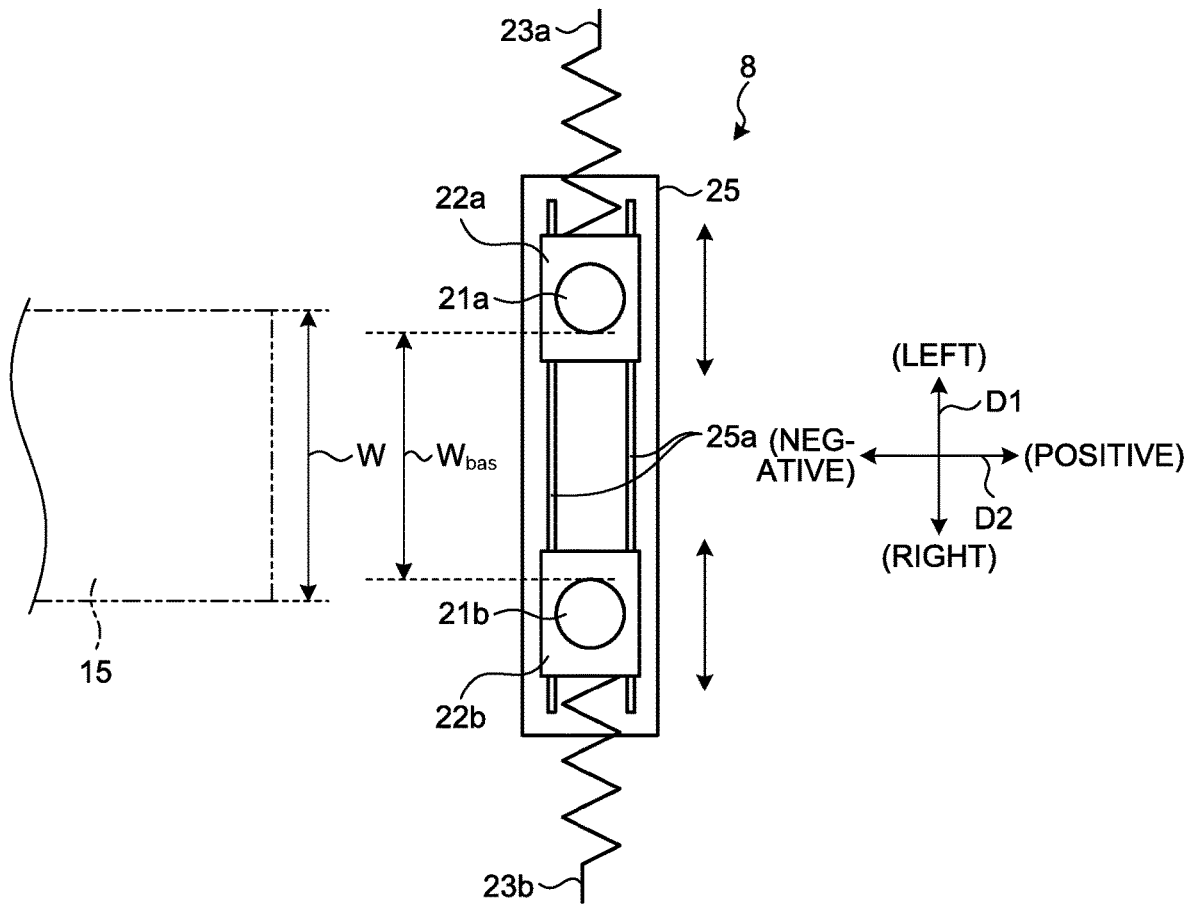
FIG. 3 is a view illustrating an exemplary structure of an edge position correction unit configured to align edge positions and to correct shift of the edge positions of a plurality of steel sheets in the embodiment of the present invention.
Figure 4:
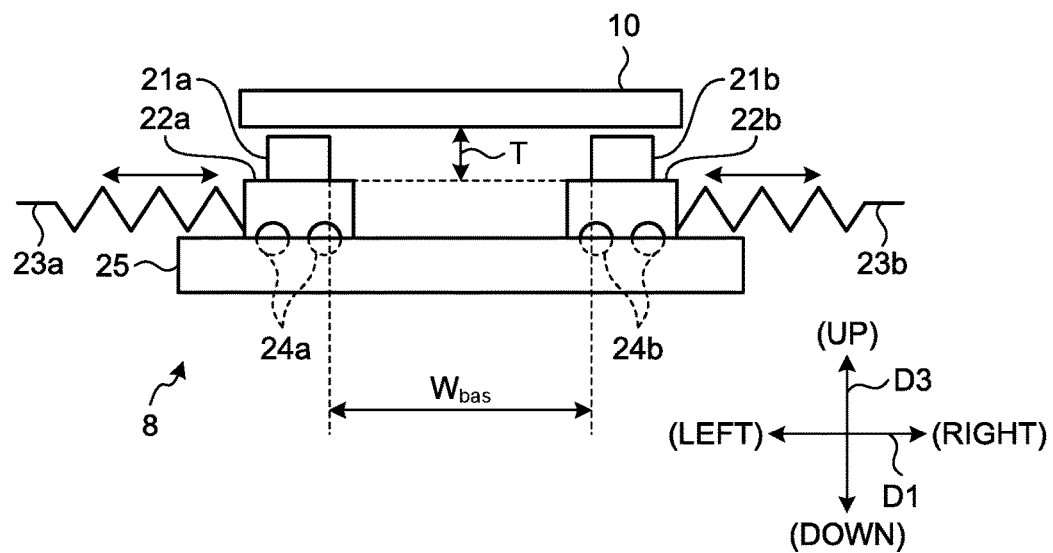
FIG. 4 is a view of the edge position correction unit illustrated in FIG. 3 as viewed from a longitudinal direction of a to-be-processed steel sheet.

Next, a structure of the edge position correction units 8 and 9 configured to align the edge positions and to correct shift of the edge positions of the steel sheets 15-1 to 15-n in the embodiment of the present invention will be described in detail. FIG. 3 is a view illustrating an exemplary structure of the edge position correction unit configured to align the edge positions and to correct shift of the edge positions of the plurality of steel sheets in the embodiment of the present invention. FIG. 4 is a view of the edge position correction unit illustrated in FIG. 3 as viewed from a longitudinal direction of a to-be-processed steel sheet. FIG. 4 also illustrates the uplift prevention unit 10 provided on the upper part of the edge position correction unit 8. Hereinafter, the edge position correction unit 8 will be exemplified on behalf of the edge position correction units 8 and 9, and the structure of the edge position correction unit 8 will be described with reference to FIGS. 3 and 4. The remaining edge position correction unit 9 is similar to the edge position correction unit 8 except that the position to be installed is different.

As illustrated in FIGS. 3 and 4, the edge position correction unit 8 includes a pair of side guide rollers 21a and 21b facing each other in the width direction D1 of the plurality of steel sheets 15 to be processed (see FIGS. 1 and 2); a pair of roller stages 22a and 22b, serving as movable bases, on which the side guide rollers 21a and 21b are disposed respectively; a pair of springs 23a and 23b configured to generate elastic force to bias the pair of side guide rollers 21a and 21b in a facing direction; and a basement 25 provided with a rail 25a to regulate moving directions and an amount of movement of the pair of roller stages 22a and 22b.

The pair of side guide rollers 21a and 21b are rotative rolling bodies facing each other in the width direction D1. One of the side guide rollers 21a is rotatably attached to an upper surface of the roller stage 22a about an axis (not illustrated) in the thickness direction D3. The other side guide roller 21b is rotatably attached to an upper surface of the roller stage 22b about an axis (not illustrated) in the thickness direction D3. As illustrated in FIGS. 3 and 4, in regard to the pair of side guide rollers 21a and 21b attached to the pair of roller stages 22a and 22b in such manners, each peripheral surface faces each other in the width direction D1.

The pair of roller stages 22a and 22b is respectively provided with the pair of side guide rollers 21a and 21b, each independently serving as the movable stand in the width direction D1. Specifically, as illustrated in FIG. 4, one of the roller stages 22a (the left side in the width direction D1) is provided with the side guide roller 21a on the upper surface and a wheel 24a on the lower part. The roller stage 22a is installed in such a manner that the wheel 24a is mounted on the rail 25a of the basement 25 illustrated in FIG. 3, being movable together with the side guide roller 21a in the width direction D1 along the rail 25a. The other roller stage 22b (the right side in the width direction D1) is provided with the side guide rollers 21b on the upper surface and a wheel 24b on the lower part. The roller stage 22b is installed in such a manner that the wheel 24b is mounted on the rail 25a of the basement 25 illustrated in FIG. 3, being movable together with the side guide roller 21b in the width direction D1 along the rail 25a. Furthermore, the pair of roller stages 22a and 22b mounted on the rail 25a makes the pair of side guide rollers 21a and 21b face each other in the width direction D1.

As illustrated in FIGS. 3 and 4, the pair of springs 23a and 23b is attached to the pair of roller stages 22a and 22b, respectively. Specifically, one spring 23a of the pair of springs 23a and 23b has one end connected to a rear end (the left end in the width direction D1) of the roller stage 22a and the other end connected to a predetermined fixed end (not illustrated), being configured to extend and contract in the width direction D1 with the movement of the roller stage 22a. The spring 23a contracts from the natural length in the width direction D1 as the roller stage 22a moves in a direction apart from the roller stage 22b on the right side in the width direction D1 (that is, in a leftward direction in the width direction D1). Accordingly, the spring 23a generates the elastic force to bias the pair of side guide rollers 21a and 21b on the pair of roller stages 22a and 22b in the facing direction (particularly, a direction in which the side guide roller 21a on the left side in the width direction D1 approaches the side guide roller 21b on the right side in the width direction D1).

The other spring 23b has one end connected to a rear end (the right end in the width direction D1) of the roller stage 22b and the other end connected to a predetermined fixed end (not illustrated), being configured to extend and contract in the width direction D1 with the movement of the roller stage 22b. The spring 23b contracts from the natural length in the width direction D1 as the roller stage 22b moves in a direction apart from the roller stage 22a on the left side in the width direction D1 (that is, in a rightward direction in the width direction D1). Accordingly, the spring 23b generates the elastic force to bias the pair of side guide rollers 21a and 21b on the pair of roller stages 22a and 22b in the facing direction (particularly, a direction in which the side guide roller 21b on the right side in the width direction D1 approaches the side guide roller 21a on the left side in the width direction D1).

When the pair of side guide rollers 21a and 21b separates from each other and exceeds a reference interval $W_{bas}$ (see FIGS. 3 and 4), such a pair of springs 23a and 23b contracts from the natural length in the width direction D1 so as to generate the elastic force to bias the pair of side guide rollers 21a and 21b in the facing direction. In other words, the pair of springs 23a and 23b generates the elastic force when an interval between the pair of side guide rollers 21a and 21b is larger than the reference interval $W_{bas}$. Each elastic force of the pair of springs 23a and 23b increases as the interval between the pair of side guide rollers 21a and 21b becomes larger than the reference interval $W_{bas}$. The pair of springs 23a and 23b applies such elastic force to the pair of roller stages 22a and 22b, and independently biases the pair of roller stages 22a and 22b in the direction in which the pair of side guide rollers 21a and 21b approaches each other.

Herein, the reference interval $W_{bas}$ of the pair of side guide rollers 21a and 21b illustrated in FIGS. 3 and 4 can be set to any value in accordance with the pair of springs 23a and 23b respectively provided to the pair of roller stages 22a and 22b as described above. In this embodiment, the reference interval $W_{bas}$ a threshold of the interval between the pair of side guide rollers 21a and 21b facing each other in the width direction D1. For example, the reference interval $W_{bas}$ is defined as the interval between the pair of side guide rollers 21a and 21b on the pair of roller stages 22a and 22b when the pair of springs 23a and 23b is in a state of the natural length.

In this embodiment, the reference interval $W_{bas}$ is set narrower than the sheet width W of the plurality of steel sheets 15 (particularly, each sheet width W of the steel sheets 15-1 to 15-n). Preferably, the reference interval $W_{bas}$ is set to such a degree that each of the plurality of steel sheets 15 is not deformed by pressing force in the width direction D1 (that is, the elastic force of the pair of springs 23a and 23b) received from the pair of side guide rollers 21a and 21b. More preferably, the reference interval $W_{bas}$ is set so as to satisfy the following Formula (1) represented with each sheet width W, and each sheet thickness t of the steel sheets 15-1 to 15-n.

$$W > W_{bas} > W - 50 \times t \quad (1)$$

The basement 25 is a stand provided with the rail 25a on which the wheels 24a and 24b of the pair of roller stages 22a and 22b are placed. The rail 25a extends in a direction perpendicular to the feeding direction (longitudinal direction D2) of the plurality of steel sheets 15 and in a direction parallel to sheet surfaces of the plurality of steel sheets 15 (surfaces of the laminated core materials), that is, the width direction D1 (see FIG. 3). The rail 25a extending in the width direction D1 in this manner regulates the moving directions of the pair of roller stages 22a and 22b in the width direction D1. The rail 25a also regulates movable ranges of the pair of roller stages 22a and 22b in the width direction D1 in accordance with its own length (a rail length in the width direction D1).

As illustrated in FIG. 4, the uplift prevention unit 10 is provided on the upper part of the edge position correction unit 8. The uplift prevention unit 10 includes a plate-like member or a rotative rolling body that rotates about an axis in the width direction D1. As illustrated in FIG. 4, the uplift prevention unit 10 is installed so as to close the upper side of a space between the pair of side guide rollers 21a and 21b, forming a predetermined gap T above the upper surfaces of the pair of roller stages 22a and 22b in the thickness direction D3.

Herein, between the uplift prevention unit 10 and the upper surfaces of the pair of roller stages 22a and 22b provided with the pair of side guide rollers 21a and 21b, it is preferable to form a gap wide enough to allow the plurality of steel sheets 15 (n-pieces of steel sheets 15-1 to 15-n) overlapped in the thickness direction D3 to pass therethrough. In other words, the gap T between the uplift prevention unit 10 and the pair of roller stages 22a and 22b is set so as to exceed a total sheet thickness (=n×t) of the n-pieces of overlapped steel sheets 15-1 to 15-n. Preferably, the gap T is set to 1/100 or less of each sheet width W of the steel sheets 15-1 to 15-n. More preferably, from a viewpoint of preventing the plurality of steel sheets 15 from being lifted and preventing the plurality of steel sheets 15 from getting caught in the uplift prevention unit 10, the gap T is set so as to satisfy the following Formula (2) represented with each sheet thickness t of the steel sheets 15-1 to 15-n and the number of overlapped sheets (the number of laminated sheets=n).

$$10 \times n \times t > T > 2 \times n \times t \quad (2)$$

The structure of the uplift prevention unit 10 is similar to the structure of the uplift prevention unit 11 provided on the upper part of the edge position correction unit 9 illustrated in FIG. 1. The uplift prevention units 10 and 11 are also similar in regard to the gap T illustrated in FIG. 4.

(Edge Aligning Operation)

Figure 5:
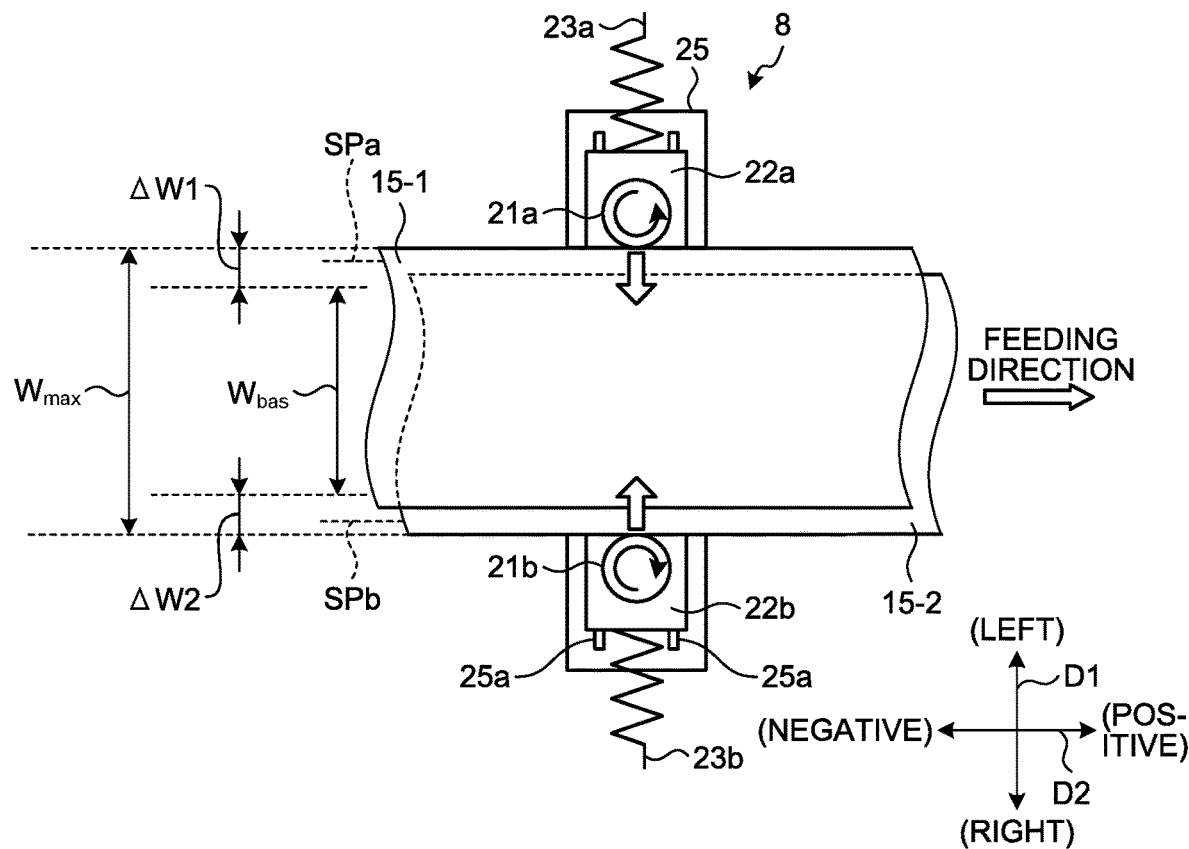
FIG. 5 is a view for describing an edge aligning operation for aligning the edge positions and for correcting shift of the edge positions of the plurality of steel sheets in the embodiment of the present invention.
Figure 6:
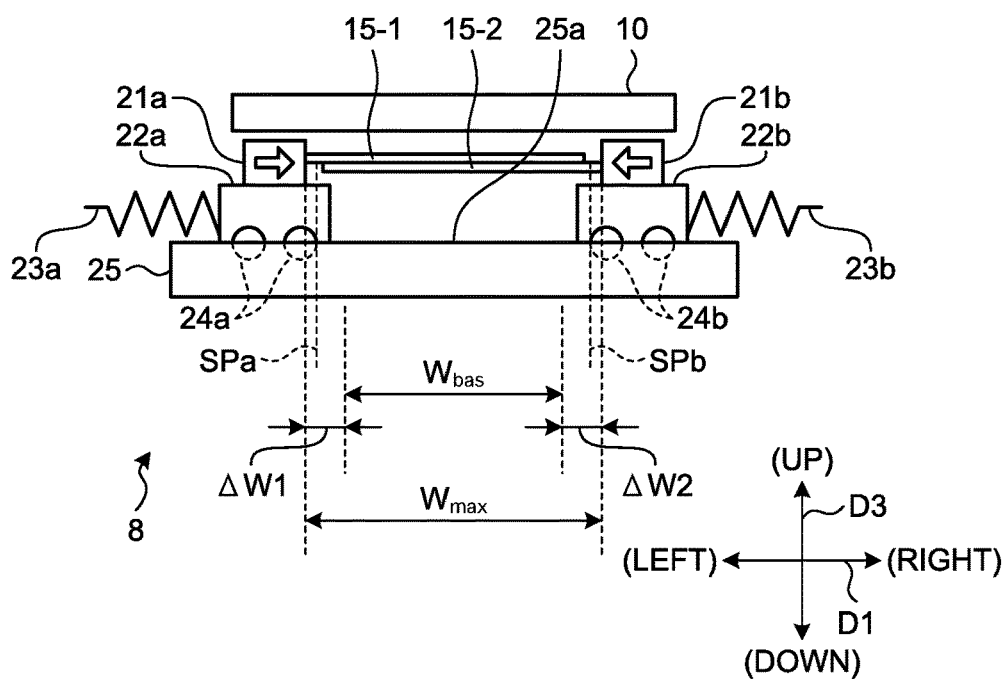
FIG. 6 is a view from another angle for describing the edge aligning operation for aligning the edge positions and for correcting shift of the edge positions of the plurality of steel sheets in the embodiment of the present invention.

Next, an operation performed by the edge position correction units 8 and 9 to align the edge positions and to correct shift of the edge positions of the steel sheets 15-1 to 15-$n$ in the embodiment of the present invention, that is, an edge aligning operation will be described in detail. FIG. 5 is a view for describing the edge aligning operation for aligning the edge positions and for correcting shift of the edge positions of the plurality of steel sheets in the embodiment of the present invention. FIG. 6 is a view from another angle for describing the edge aligning operation for aligning the edge positions and for correcting shift of the edge positions of the plurality of steel sheets in the embodiment of the present invention. FIG. 5 illustrates the edge aligning operation as viewed from the upper side in the thickness direction D3. FIG. 6 illustrates the edge aligning operation as viewed in a direction facing the feeding direction of the plurality of steel sheets 15 (the positive side in the longitudinal direction D2).

Hereinafter, the edge position correction unit 8 will be exemplified on behalf of the edge position correction units 8 and 9, and two steel sheets 15-1 and 15-2 will be exemplified as the plurality of steel sheets 15. Accordingly, the edge aligning operation with respect to the plurality of steel sheets 15 will be described with reference to FIGS. 5 and 6. The edge aligning operation by the remaining edge position correction unit 9 is similar to the edge position correction unit 8. Furthermore, in the edge aligning operation performed by the edge position correction units 8 and 9, a case where the number of overlapped sheets in the plurality of steel sheets 15 is two is similar to a case where the number of overlapped sheets is three or more.

As illustrated in FIGS. 5 and 6, between the pair of side guide rollers 21a and 21b, the edge position correction unit 8 receives the steel sheets 15-1 and 15-2 sequentially conveyed in an overlapped state in the thickness direction D3, and sandwiches the same in the width direction D1 with the pair of side guide rollers 21a and 21b facing each other in the width direction D1. The edge position correction unit 8 rotates the pair of side guide rollers 21a and 21b about the axes in the thickness direction D3 to continue conveyance (feeding) of the steel sheets 15-1 and 15-2 in the longitudinal direction D2. Simultaneously, the edge position correction unit 8 allows the pair of side guide rollers 21a and 21b to act the elastic force of the pair of springs 23a and 23b on each edge of the steel sheets 15-1 and 15-2, so as to align each edge position and correcting shift of each edge position of the steel sheets 15-1 and 15-2.

Particularly, in the edge position correction unit 8 that performs the edge aligning operation as illustrated in FIGS. 5 and 6, the side guide roller 21a receives force from the left edge of the steel sheet 15-1 shifted to the left side in the width direction D1 relative to the steel sheet 15-2. The roller stage 22a moves to the left side in the width direction D1 along the rail 25a of the basement 25 by the force acting on the side guide roller 21a from the steel sheet 15-1 in this manner. On the other hand, the side guide roller 21b receives force from the right edge of the steel sheet 15-2 shifted to the right side in the width direction D1 relative to the steel sheet 15-1. The roller stage 22b moves to the right side in the width direction D1 along the rail 25a of the basement 25 by the force acting on the side guide roller 21b from the steel sheet 15-2 in this manner. In such manners, the pair of roller stages 22a and 22b moves in directions apart from each other, which causes the interval between the pair of side guide rollers 21a and 21b to increase up to an interval equivalent to a maximum edge-to-edge distance $W_{max}$ of the steel sheets 15-1 and 15-2 as illustrated in FIGS. 5 and 6.

Herein, the maximum edge-to-edge distance $W_{max}$ is a distance between the farthest edges in the width direction D1 in the plurality of laminated core materials. In other words, in a case where the number of the plurality of steel sheets 15 as the plurality of laminated core materials is two: the steel sheets 15-1 and 15-2 as illustrated in FIGS. 5 and 6, the maximum edge-to-edge distance $W_{max}$ is determined by a distance between the farthest edges in the width direction D1 in these steel sheets 15-1 and 15-2. Specifically, the maximum edge-to-edge distance $W_{max}$ is a separation distance between the left edge of the steel sheet 15-1 shifted to the left side in the width direction D1 and the right edge of the steel sheet 15-2 shifted to the right side in the width direction D1.

In the present embodiment, as illustrated in FIGS. 5 and 6, the maximum edge-to-edge distance $W_{max}$ is equivalent to a value (distance) obtained by adding the reference interval $W_{bas}$ between the pair of side guide rollers 21a and 21b to amounts of shift $\Delta W1$ and $\Delta W2$ in the width direction D1 of the plurality of steel sheets 15 (the steel sheets 15-1 and 15-2 in examples illustrated in FIGS. 5 and 6).

The amount of shift $\Delta W1$ on the left side in the width direction D1 is the amount of shift of the plurality of steel sheets 15 from a standard position of the side guide roller 21a, corresponding to a distance between the standard position of the side guide roller 21a and the left edge position of the laminated core material which shifts farthest to the left side in the width direction D1 (for example, the steel sheet 15-1 illustrated in FIGS. 5 and 6). Such an amount of shift $\Delta W1$ includes the amount of relative shift of each edge position on the left side in the width direction D1 of the laminated core materials (for example, the amount of relative shift of the left edge position in the width direction D1 of the steel sheet 15-1 with respect to the steel sheet 15-2) and the amount of shift (amount of meandering) of the plurality of steel sheets 15 with respect to the standard edge position SPa on the left side in the width direction D1.

On the other hand, the amount of shift $\Delta W2$ on the right side in the width direction D1 is the amount of shift of the plurality of steel sheets 15 from a standard position of the side guide roller 21b, corresponding to a distance between the standard position of the side guide roller 21b and the right edge position of the laminated core material which shifts farthest to the right side in the width direction D1 (for example, the steel sheet 15-2 illustrated in FIGS. 5 and 6). Such an amount of shift $\Delta W2$ includes the amount of relative shift of each edge position on the right side in the width direction D1 of the laminated core materials (for example, the amount of relative shift of the right edge position in the width direction D1 of the steel sheet 15-2 with respect to the steel sheet 15-1) and the amount of shift (amount of meandering) of the plurality of steel sheets 15 with respect to the standard edge position SPb on the right side in the width direction D1.

The standard position of the side guide roller 21a is the right end in the width direction D1 of the side guide roller 21a which is apart from the side guide roller 21b by the reference interval $W_{bas}$. The standard position of the side guide roller 21b is the left end in the width direction D1 of the side guide roller 21b which is apart from the side guide roller 21a by the reference interval $W_{bas}$.

As illustrated FIGS. 5 and 6, when the interval between the pair of side guide rolls 21a and 21b exceeds the reference interval $W_{bas}$ and spreads to the maximum edge-to-edge distance $W_{max}$ of the steel sheets 15-1 and 15-2, the pair of springs 23a and 23b contracts from the natural length in the width direction D1 as the pair of roller stages 22a and 22b moves in the directions apart from each other, and then, the pair of roller stages 22a and 22b generates the elastic force to bias the pair of side guide rollers 21a and 21b in the facing direction.

Particularly, the spring 23a generates the elastic force to bias the side guide roller 21a on the left side toward the side guide roller 21b on the right side in the facing direction in accordance with the amount of shift ΔW1 on the left side in the width direction D1 of the steel sheets 15-1 and 15-2 illustrated in FIGS. 5 and 6. The elastic force of the spring 23a increases with an increase in the amount of shift ΔW1 and decreases with a decrease in the amount of shift ΔW1. The spring 23a applies the elastic force generated in this manner to the roller stage 22a on the left side in the width direction D1 of the pair of roller stages 22a and 22b. On the other hand, the spring 23b generates the elastic force to bias the side guide roller 21b on the right side toward the side guide roller 21a on the left side in the facing direction in accordance with the amount of shift ΔW2 on the right side in the width direction D1 of the steel sheets 15-1 and 15-2 illustrated in FIGS. 5 and 6. The elastic force of the spring 23b increases with an increase in the amount of shift ΔW2 and decreases with a decrease in the amount of shift ΔW2. The spring 23b applies the elastic force generated in this manner to the roller stage 22b on the right side in the width direction D1 of the pair of roller stages 22a and 22b.

The pair of roller stages 22a and 22b independently moves toward each other along the rails 25a by the applied elastic force of the pair of springs 23a and 23b. Furthermore, the pair of roller stages 22a and 22b moves in the width direction D1 along the rail 25a in accordance with balance of the force acting on the pair of side guide rollers 21a and 21b from each edge of the steel sheets 15-1 and 15-2. Accordingly, the center position between the pair of roller stages 22a and 22b moves close to the center position of the maximum edge-to-edge distance $W_{max}$ of the steel sheets 15-1 and 15-2.

Moving together with the pair of roller stages 22a and 22b in an integrated manner, the pair of side guide rollers 21a and 21b is biased in the direction in which the pair of side guide rollers 21a and 21b approaches each other along the width direction D1 due to the elastic force of the pair of springs 23a and 23b acting on the pair of roller stages 22a and 22b. The pair of side guide rollers 21a and 21b sandwiches the plurality of steel sheets 15 in the width direction D1 by the elastic force of the pair of springs 23a and 23b, and aligns the edge positions of the plurality of steel sheets 15 between the steel sheets 15-1 to 15-n. At the same time, the pair of side guide rollers 21a and 21b corrects shift of the edge positions of the plurality of steel sheets 15 with respect to the standard edge positions SPa and SPb in the width direction D1 due to the elastic force of the pair of springs 23a and 23b.

Specifically, as illustrated in FIGS. 5 and 6, one of the side guide rollers 21a (on the left side in the width direction D1) presses the left edge of the steel sheet 15-1 toward the right side in the width direction D1 by the elastic force of the spring 23a applied to the roller stage 22a. Herein, as illustrated in FIGS. 5 and 6, in two steel sheets 15-1 and 15-2 whose edges are to be arranged, the steel sheet 15-1 shifts to the left side in the width direction D1 relative to the steel sheet 15-2. The side guide roller 21a presses the left edge of the steel sheet 15-1 in a direction indicated by thick arrows in FIGS. 5 and 6 so as to reduce the amount of shift ΔW1 of the steel sheet 15-1 from the standard position of the side guide roller 21a. Accordingly, the side guide roller 21a aligns the left edge position of the steel sheet 15-1 and the left edge position of the steel sheet 15-2. At the same time, the side guide roller 21a corrects shift of the left edge positions of the steel sheets 15-1 and 15-2 with respect to the standard edge position SPa so that the left edge positions of the steel sheets 15-1 and 15-2 correspond to the standard edge position SPa. In this case, the side guide roller 21a rotates freely about the axis in the thickness direction D3 while coming into contact with the left edge of the steel sheet 15-1 or each left edge of the steel sheets 15-1 and 15-2 (see FIG. 5). Accordingly, the side guide roller 21a does not obstruct the conveyance (feeding) of the steel sheets 15-1 and 15-2 while aligning the left edge positions and correcting shift of the edge positions of the steel sheets 15-1 and 15-2.

The other side guide roller 21b (on the right side in the width direction D1) presses the right edge of the steel sheet 15-2 toward the left side in the width direction D1 by the elastic force of the spring 23b applied to the roller stage 22b. Herein, as illustrated in FIGS. 5 and 6, in two steel sheets 15-1 and 15-2 whose edges are to be arranged, the steel sheet 15-2 shifts to the right side in the width direction D1 relative to the steel sheet 15-1. The side guide roller 21b presses the right edge of the steel sheet 15-2 in a direction indicated by thick arrows in FIGS. 5 and 6 so as to reduce the amount of shift ΔW2 of the steel sheet 15-2 from the standard position of the side guide roller 21b. Accordingly, the side guide roller 21b aligns the right edge position of the steel sheet 15-2 and the right edge position of the steel sheet 15-1. At the same time, the side guide roller 21b corrects shift of the right edge positions of the steel sheets 15-1 and 15-2 with respect to the standard edge position SPb so that the right edge positions of the steel sheets 15-1 and 15-2 correspond to the standard edge position SPb. In this case, the side guide roller 21b rotates freely about the axis in the thickness direction D3 while coming into contact with the right edge of the steel sheet 15-2 or each right edge of the steel sheets 15-1 and 15-2 (see FIG. 5). Accordingly, the side guide roller 21b does not obstruct the conveyance (feeding) of the steel sheets 15-1 and 15-2 while aligning the right edge positions and correcting shift of the edge positions of the steel sheets 15-1 and 15-2.

Furthermore, as described above, the pair of roller stages 22a and 22b moves in the width direction D1 along the rail 25a in accordance with balance of the force acting on the pair of side guide rollers 21a and 21b from each edge of the steel sheets 15-1 and 15-2. The pair of side guide rollers 21a and 21b moves in the width direction D1 together with such a pair of roller stages 22a and 22b. Accordingly, the center position between the pair of side guide rollers 21a and 21b moves close to the center position of the maximum edge-to-edge distance $W_{max}$ of the steel sheets 15-1 and 15-2. In this case, the pair of side guide rollers 21a and 21b can act the pressing force (that is, the elastic force of the pair of springs 23a and 23b) equally on the steel sheets 15-1 and 15-2 from both right and left sides in the width direction D1. An effect of this action contributes to an uplift-prevention effect of the steel sheets 15-1 and 15-2 by the uplift prevention unit 10 illustrated in FIG. 6, and enhances the uplift-prevention effect.

(Laminated Core Manufacturing Method)

Figure 7:
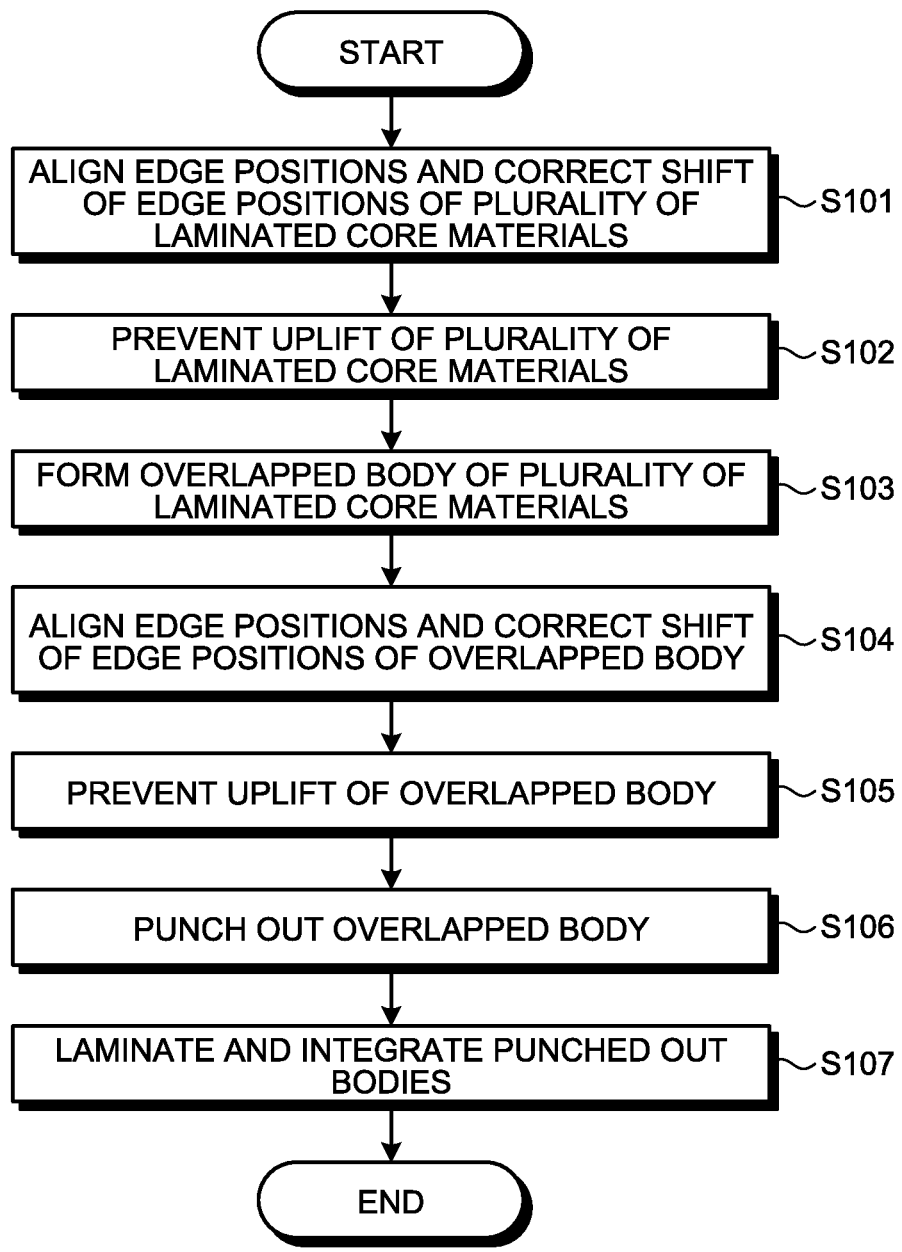
FIG. 7 is a flowchart illustrating an example of a laminated core manufacturing method according to the embodiment of the present invention.

Next, the laminated core manufacturing method according to the embodiment of the present invention will be described. FIG. 7 is a flowchart illustrating an example of the laminated core manufacturing method according to the embodiment of the present invention. In the laminated core manufacturing method according to the embodiment of the present invention, each process (operation) in Steps S101 to S107 illustrated in FIG. 7 is sequentially performed by the laminated core manufacturing device 1 so as to laminate and integrate a plurality of punched bodies of the laminated core materials, thereby manufacturing a laminated core.

In other words, in the laminated core manufacturing method according to the embodiment of the present invention, as illustrated in FIG. 7, the laminated core manufacturing device 1 aligns the edge positions and corrects shift of the edge positions of the plurality of laminated core materials overlapped while being conveyed along the different conveyance routes (Step S101).

In Step S101, the feed roller group 5 receives the plurality of steel sheets 15 conveyed along the different conveyance routes, and then overlaps the steel sheets 15-1 to 15-*n* of the plurality of steel sheets 15 in the thickness direction D3. The feed roller group 5 sequentially feeds the plurality of overlapped steel sheets 15 to the edge position correction unit 8 in the subsequent stage.

Next, between the pair of side guide rollers 21*a* and 21*b*, the edge position correction unit 8 receives the plurality of steel sheets 15 fed from the feed roller group 5 in an overlapped state. The edge position correction unit 8 performs the edge aligning operation (see FIGS. 5 and 6) such as action of the elastic force of the pair of springs 23*a* and 23*b* on each edge of the plurality of received steel sheets 15 from both right and left sides in the width direction D1, involving the pair of side guide rollers 21*a* and 21*b*. Accordingly, the edge position correction unit 8 aligns the edge positions on both sides in the width direction D1 of the plurality of steel sheets 15 between the steel sheets 15-1 to 15-*n*, and corrects meandering in the width direction D1 of the plurality of steel sheets 15, and corrects shift of the edge positions of the plurality of steel sheets 15 with respect to the standard edge positions SPa and SPb. Thus, the edge positions (the edge positions Pa and Pb illustrated in FIG. 2) of the plurality of steel sheets 15 are reduced in amount of shift from the standard edge positions SPa and SPb (desirably, correspond to the standard edge positions SPa and SPb) while being aligned between the overlapped steel sheets 15-1 to 15-*n*.

Next, the laminated core manufacturing device 1 prevents uplift of the plurality of laminated core materials in which the edge positions have been aligned and shift of the edge positions has been corrected in Step S101 (Step S102). In Step S102, the uplift prevention unit 10 closes the upper side of the space (specifically, the interval between the pair of side guide rollers 21*a* and 21*b*) in the edge position correction unit 8 that allows the plurality of steel sheets 15 to pass therethrough. Accordingly, the uplift prevention unit 10 prevents uplift of the plurality of steel sheets 15 in which the edge positions are aligned and shift of the edge positions is corrected by the edge position correction unit 8 due to the pressing force received from both right and left sides in the width direction D1, particularly, uplift of each edge of the steel sheets 15-1 to 15-*n*. In regard to the plurality of steel sheets 15 after being subjected to alignment of the edge positions and correction of shift of the edge positions (hereinafter appropriately referred to as after the edge alignment) while prevented from being lifted in this manner by the uplift prevention unit 10, the edge position correction unit 8 allows the plurality of steel sheets 15 to sequentially pass therethrough toward the pinch roller 12 in the subsequent stage from between the pair of side guide rollers 21*a* and 21*b*.

After performing the aforementioned Step S102, the laminated core manufacturing device 1 forms the overlapped body 18 of the plurality of laminated core materials which has been subjected to each process in Steps S101 and S102 (Step S103).

In Step S103, the plurality of steel sheets 15 that has passed through the edge position correction unit 8 from the feed roller group 5 as described above reaches the inlet of the pinch roller 12. In other words, the plurality of steel sheets 15 herein is a plurality of laminated core materials conveyed along different conveyance routes and subjected to the process to align the edge positions and correct shift of the edge positions (edge aligning process) in Step S101; and the process to prevent uplift in Step S102. The pinch roller 12 sequentially receives the steel sheets 15-1 to 15-*n* of the plurality of steel sheets 15 as the laminated core materials, and sandwiches the received steel sheets 15-1 to 15-*n* in the thickness direction D3 so as to overlap the steel sheets 15-1 to 15-*n* while pressing the same. Accordingly, the pinch roller 12 obtains the overlapped body 18 of the plurality (n-pieces) of laminated core materials. The pinch roller 12 sequentially feeds the overlapped body 18 formed in this manner to the edge position correction unit 9 in the subsequent stage.

After performing the aforementioned Step S103, the laminated core manufacturing device 1 aligns the edge positions and corrects shift of the edge positions of the overlapped body 18 of the steel sheets 15-1 to 15-*n* formed in Step S103 (Step S104).

In Step S104, the edge position correction unit 9 receives the overlapped body 18 fed from the pinch roller 12 between the pair of side guide rollers as similar to the case of the aforementioned edge position correction unit 8. The edge position correction unit 9 performs the edge aligning operation on each edge of the received overlapped body 18 as similar to the case of the aforementioned edge position correction unit 8. Accordingly, the edge position correction unit 9 aligns the edge positions on both sides in the width direction D1 of the overlapped body 18 (that is, the plurality of overlapped laminated core materials) between the steel sheets 15-1 to 15-*n* of the overlapped body 18, and corrects meandering in the width direction D1 of the overlapped body 18, and corrects shift of the edge positions of the overlapped body 18 with respect to the standard edge positions SPa and SPb. Thus, the edge positions (the edge positions Pa and Pb illustrated in FIG. 2) of the overlapped body 18 are reduced in amount of shift from the standard edge positions SPa and SPb (desirably, correspond to the standard edge positions SPa and SPb) while being aligned between the overlapped steel sheets 15-1 to 15-*n*.

Next, the laminated core manufacturing device 1 prevents uplift of the overlapped body 18 in which the edge positions have been aligned and shift of the edge positions has been corrected in Step S104 (Step S105). In Step S105, the uplift prevention unit 11 closes the upper side of the space (specifically, the interval between the pair of side guide rollers) in the edge position correction unit 9 that allows the overlapped body 18 to pass therethrough. Accordingly, the uplift prevention unit 11 prevents uplift of the overlapped body 18 in which the edge positions are aligned and shift of the edge positions is corrected by the edge position correction unit 9 due to the pressing force received from both right and left sides in the width direction D1, particularly, uplift of each edge of the steel sheets 15-1 to 15-*n*. In regard to the overlapped body 18 after the edge alignment while prevented from being lift in this manner by the uplift prevention unit 11, the edge position correction unit 9 allows the overlapped body 18 to sequentially pass therethrough toward the dies (between the upper die 13*a* and the lower die 13*b*) of the pressing machine 13 in the subsequent stage from between the pair of side guide rollers.

After performing the aforementioned Step S105, the laminated core manufacturing device 1 punches out the overlapped body 18 which has been subjected to each process in Steps S104 and S105, so as to obtain a punched out body of the plurality of laminated core materials (Step S106).

In Step S106, the pressing machine 13 sequentially receives, between the upper die 13*a* and the lower die 13*b*, the overlapped body 18 that has passed through the edge position correction unit 9 from the pinch roller 12 as described above. The overlapped body 18 herein is a plurality of laminated core materials overlapped in Step S103 and subjected to the process to align the edge positions and to correct shift of the edge positions in Step S104; and the process to prevent uplift in Step S105 (edge aligning process). The pressing machine 13 sandwiches such an overlapped body 18 between the upper die 13*a* and the lower die 13*b* so as to restrain the same. Next, the pressing machine 13 simultaneously punches out the restrained overlapped body 18 in the thickness direction D3, using the upper die 13*a* and the lower die 13*b*. Accordingly, the pressing machine 13 manufactures the punched out body of the plurality of laminated core materials (specifically, the steel sheets 15-1 to 15-*n*) having the target core shape from the overlapped body 18. Every time the overlapped body 18 is received between the upper die 13*a* and the lower die 13*b* in this manner, the pressing machine 13 continuously performs the punching process on the received overlapped body 18. Thus, the pressing machine 13 manufactures a plurality of punched bodies having the target core shape.

After performing the aforementioned Step S106, the laminated core manufacturing device 1 laminates and integrates the plurality of punched bodies obtained in Step S106, so as to manufacture a desired laminated core (Step S107). In Step S107, the pressing machine 13 laminates the plurality of punched bodies obtained in Step S106 with the upper die 13*a* and the lower die 13*b* in such a manner that each rolling direction of the steel sheets 15-1 to 15-*n*, which are the materials, aligns in the same direction, and then, the pressing machine 13 integrates the plurality of laminated punched bodies with caulking and the like. Thus, the pressing machine 13 manufactures the laminated core having the target shape.

In this Step S107, the integration of the core-shaped punched bodies may be achieved as the pressing machine 13 forms dowels for caulking into punched bodies with its die (that is, a die including the upper die 13*a* and the lower die 13*b*, the same applies hereinafter) and presses these dowels with a predetermined device to caulk the punched bodies with each other. The integration of the core-shaped punched bodies may also be achieved by welding the punched bodies outside the die of the pressing machine 13 with an external device, or by fixing the punched bodies to each other with a fixing unit such as a bolt or an adhesive.

In the laminated core manufacturing method according to the embodiment of the present invention, each process in the aforementioned Steps S101 to S107 is repetitively performed every time a laminated core is manufactured using the steel sheets 15-1 to 15-*n* as the laminated core materials.

In the aforementioned embodiment, the number of steel sheets to be overlapped and punched out as the laminated core materials is plural (two or more). From a viewpoint of increasing production efficiency of a laminated core, it should be noted that the number of steel sheets (laminated core materials) to be overlapped and punched out is preferably more than two (for example, three or more). However, an increase in the number of steel sheets to be overlapped increases an amount of shape deviation in the steel sheets after punching (that is, the punched out body of the overlapped laminated core materials) and an amount of droop in a punched surface. Therefore, the number of steel sheets to be overlapped is preferably two or more, and four or less.

In the aforementioned embodiment, the edge position correction units 8 and 9 are respectively installed at the position just before the inlet and the position just behind the outlet of the pinch roller 12, but the present invention is not limited thereto. The edge position correction unit in accordance with aspects of the present invention may be installed only at the position just before the inlet of the pinch roller 12, or may be installed only at the position just behind the outlet of the pinch roller 12.

Figure 8:
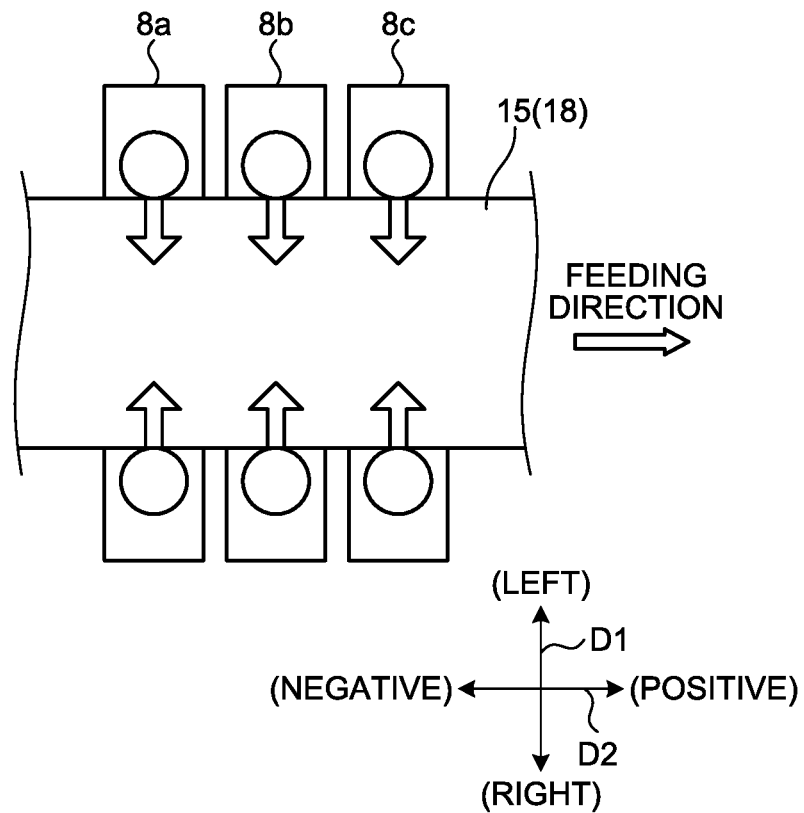
FIG. 8 is a view illustrating an example of installing a plurality of edge position correction units in the embodiment of the present invention.

Furthermore, in the aforementioned embodiment, the edge position correction units 8 and 9 are singularly installed at the position just before the inlet and the position just behind the outlet of the pinch roller 12, but the present invention is not limited thereto. In accordance with aspects of the present invention, the number of the edge position correction units to be installed may be one or more at the position just before the inlet of the pinch roller 12. Alternatively, the number of installations may be one or more at the position just behind the outlet of the pinch roller 12, or may be one or more at each of the positions just before the inlet and just behind the outlet of the pinch roller 12. In accordance with aspects of the present invention, a plurality of edge position correction units may be installed just before the inlet of the pinch roller 12 or just behind the outlet of the pinch roller 12, or may be installed at each of the positions just before the inlet and just behind the outlet of the pinch roller 12 in such a manner that the plurality of edge position correction units is arranged side by side along the conveyance routes of the plurality of laminated core materials. For example, as illustrated in FIG. 8, a plurality of (three, herein) edge position correction units 8*a*, 8*b*, and 8*c* having a structure similar to that of the edge position correction unit 8 illustrated in FIGS. 3 and 4 may be installed in the feeding direction of the plurality of steel sheets 15 or the overlapped body 18 (a direction perpendicular to the width direction D1 and the thickness direction D3, that is, the longitudinal direction D2) so that the edge position correction units 8*a*, 8*b*, and 8*c* are adjacent to each other.

In the aforementioned embodiment, the plurality of laminated core materials is overlapped by the feed roller group 5 positioned in the preceding stage of the pinch roller 12, that is, a plurality of horizontally arranged feed rollers (for example, five feed rollers 5*a* to 5*e*), but the present invention is not limited thereto. In accordance with aspects of the present invention, instead of the feed roller group 5, a flat stage may be provided, and the plurality of laminated core materials may be overlapped on this stage. Alternatively, without providing any overlapping unit such as the feed roller group 5 and the flat stage in the preceding stage of the pinch roller 12, the plurality of laminated core materials may be overlapped by the pinch roller 12 for the first time.

Furthermore, in the aforementioned embodiment, each conveyance route of the steel sheets 15-1 to 15-*n* is provided with two feed rollers, but the present invention is not limited thereto. In accordance with aspects of the present invention, the number of feed rollers to be installed for each conveyance route of the steel sheets 15-1 to 15-n may be one or more as long as each conveyance route is provided with a sufficient number of feed rollers for conveying the steel sheets 15-1 to 15-n.

In the aforementioned embodiment, the electrical steel sheet is exemplified as the laminated core material, but the present invention is not limited thereto. The steel sheet as the laminated core material according to aspects of the present invention is not limited to the electrical steel sheet, but may be a steel sheet other than the electrical steel sheet, or an iron alloy sheet other than the steel sheet.

Furthermore, in the aforementioned embodiment, such an example is described that the pressing machine 13 (punching unit) is configured to perform operations from punching to laminated core manufacturing, where the punching operation is to punch out the overlapped body 18 of the plurality of steel sheets 15 so as to manufacture the plurality of core-shaped punched bodies, and the laminated core manufacturing operation is to integrate the plurality of obtained punched bodies so as to manufacture a laminated core, but the present invention is not limited to thereto. In accordance with aspects of the present invention, the pressing machine 13 may perform the punching operation, and then, may not perform the laminated core manufacturing operation.

In other words, the laminated core manufacturing device and the laminated core manufacturing method according to aspects of the present invention are provided to manufacture at least a punched out body of a plurality of laminated core materials used for manufacturing a laminated core. Therefore, the punching unit may perform operations from punching to laminated core manufacturing, where the punching process is to punch out the plurality of overlapped laminated core materials, and the laminated core manufacturing operation is to integrate a plurality of punched bodies so as to manufacture a laminated core. Alternatively, the punching unit may perform the punching operation to punch out a plurality of overlapped laminated core materials, so as to manufacture a punched out body of the plurality of laminated core materials (a core-shaped punched out body of the plurality of laminated core materials) used for manufacturing a laminated core. In regard to the punched out body of the plurality of laminated core materials manufactured by the laminated core manufacturing device and the laminated core manufacturing method according to aspects of the present invention, a plurality of punched bodies may be laminated and integrated in another operation (another manufacturing line) with a device disposed outside the die of the punching unit, so as to manufacture a laminated core.

Example 1

Hereinafter, Example 1 of the present invention will be described. Example 1 was performed to study the necessity of the edge aligning process (to align edge positions and to correct shift of the edge positions) and the uplift prevention process with respect to a plurality of laminated core materials. In Example 1, a punching test was performed as Invention Example 1, using the laminated core manufacturing device 1 according to the embodiment of the present invention (see FIGS. 1 and 2). In the punching test, a plurality of laminated core materials was overlapped and was simultaneously punched out.

As a condition of Invention Example 1, the number of laminated core materials to be overlapped was designed to be 2. In other words, steel sheets 15-1 and 15-2 as laminated core materials were respectively fed to the discharging units 2-1 and 2-2 of the laminated core manufacturing device 1. Both of these steel sheets 15-1 and 15-2 were non-oriented electrical steel sheets wound in a coil shape, having a sheet thickness of 0.20 mm and a sheet width of 250 mm.

In Invention Example 1, the laminated core manufacturing device 1 repetitively performed each process in Steps S101 to S107 illustrated in FIG. 7 with respect to the steel sheet 15-1 discharged from the discharging unit 2-1 and the steel sheet 15-2 discharged from the discharging unit 2-2, and then continuously punched out these two overlapped steel sheets 15-1 and 15-2. Herein, just before the first punching, edge positions on the right and left sides in the width direction D1 of the top-and-bottom steel sheets 15-1 and 15-2 were adjusted so as to correspond to each other, and the center positions in the width direction D1 of these steel sheets 15-1 and 15-2 (the center position between each edge on both right and left sides) were adjusted so as to correspond to each center position between the pair of side guide rollers in the edge position correction units 8 and 9. Furthermore, each reference interval $W_{bas}$ (see FIGS. 3 and 4) between the pair of side guide rollers in the edge position correction units 8 and 9 was made to correspond to each sheet width W of the steel sheets 15-1 and 15-2. A stroke rate at which the pressing machine 13 punched out a core-shaped punched out body from an overlapped body 18 of the steel sheets 15-1 and 15-2 was set to 200 spm (stroke/min), and the pressing machine 13 continuously performed the punching process up to 2000th stroke at the aforementioned stroke rate.

In Example 1, Comparative Examples 1 and 2 were performed to compare with the Invention Example 1. In Comparative Example 1, after performing the punching process of Invention Example 1, a device corresponding to the laminated core manufacturing device 1 used in Invention Example 1 with the uplift prevention units 10 and 11 being removed therefrom (hereinafter referred to as the laminated core manufacturing device of Comparative Example 1) was prepared, and the laminated core manufacturing device of Comparative Example 1 continuously performed the punching process of the steel sheets 15-1 and 15-2. In Comparative Example 2, after performing the punching process of Comparative Example 1, a device corresponding to the laminated core manufacturing device of Comparative Example 1 with the edge position correction units 8 and 9 being removed therefrom (hereinafter referred to as the laminated core manufacturing device of Comparative Example 2) was prepared, and the laminated core manufacturing device of Comparative Example 2 continuously performed the punching process of the steel sheets 15-1 and 15-2.

Conditions in Comparative Example 1 were similar to those in Invention Example 1 except that the uplift prevention process of the steel sheets 15-1 and 15-2 was not performed. Conditions in Comparative Example 2 were similar to those in Invention Example 1 except that the edge aligning process and the uplift prevention process of the steel sheets 15-1 and 15-2 were not performed.

In Example 1, for each of Invention Example 1 and Comparative Examples 1 and 2, the number of strokes by which the continuous punching process of the two overlapped steel sheets 15-1 and 15-2 could not be performed any more (hereinafter referred to as the number of continuous punching strokes), and the state of the edge positions of the steel sheets 15-1 and 15-2 after the punching test were measured so as to evaluate continuous punchability of the laminated core materials based on the obtained measurement results.

Table 1 illustrates results of evaluating the continuous punchability of the laminated core materials for each of Invention Example 1, and Comparative Examples 1 and 2.

TABLE 1

| | Number of continuous punching strokes | Edge position |
|---|---|---|
| Invention example 1 | 2000 Strokes or more | Maximum amount of shift on one side: 0.05 [mm] |
| Comparative example 1 | 200 Strokes | Maximum amount of shift on one side: 0.04 [mm] |
| Comparative example 2 | 40 Strokes | Maximum amount of shift on one side: 3.00 [mm] |

As illustrated in Table 1, the number of continuous punching strokes of the Invention Example 1 was 2000 strokes or more. In other words, in Invention Example 1, the punching process of the steel sheets 15-1 and 15-2 was performed continuously up to 2000th stroke without any particular trouble. After completing the punching test of Invention Example 1, the maximum amount of shift of the edge positions on one side in the width direction D1 of the steel sheets 15-1 and 15-2 was as small as 0.05 mm.

Compared with Invention Example 1, as illustrated in Table 1, the number of continuous punching strokes in Comparative Example 1 was 200 strokes, and after completing the punching test for 200 strokes, the maximum amount of shift of the edge positions on one side in the width direction D1 of the steel sheets 15-1 and 15-2 was 0.04 mm. In other words, in Comparative Example 1, the maximum amount of shift of the edge positions on one side in the punching test up to 200 strokes was similar to that in Invention Example 1, but the steel sheets 15-1 and 15-2 were gradually lifted during the punching process of the steel sheets 15-1 and 15-2, and the steel sheets 15-1 and 15-2 clogged the die of the pressing machine 13 at the 200th stroke, which disabled the punching process of the steel sheets 15-1 and 15-2 for 200 stokes or more.

Furthermore, as illustrated in Table 1, the number of continuous punching strokes in Comparative Example 2 was 40 strokes, and the maximum amount of shift of the edge positions on one side in the width direction D1 of the steel sheets 15-1 and 15-2 was relatively as large as 3.00 mm. In Comparative Example 2, as the overlapped steel sheets 15-1 and 15-2 were continuously punched out, these steel sheets 15-1 and 15-2 gradually shifted in the width direction D1. It was clear that such shift in the edge positions would cause a trouble so that the punching process of these steel sheets 15-1 and 15-2 was canceled at the time of 40th strokes.

From comparison results of Invention Example 1 and Comparative Examples 1 and 2, it is clear that the following matters are indispensable in a laminated core manufacturing device: to make it include an edge position correction unit and an uplift prevention unit (particularly, to provide an upper part of the edge position correction unit with the uplift prevention unit); and to perform both the edge aligning process and the uplift prevention process with respect to a plurality of laminated core materials when continuously and simultaneously punching out these plurality of overlapped laminated core materials Example 2

Hereinafter, Example 2 of the present invention will be described. Example 2 was performed to study a preferable installation position of an edge position correction unit in a laminated core manufacturing device. In Example 2, the punching test of Invention Example 1 was performed with the laminated core manufacturing device 1 according to the embodiment of the present invention under conditions substantially similar to those in the aforementioned Example 1.

In other words, in Invention Example 1 in Example 2, a reference interval $w_{bas}$ between the pair of side guide rollers in each of the edge position correction units 8 and 9 was set to 245 mm (<a sheet width W=250 mm), and a gap T (see FIG. 4) between the upper surfaces of the roller stages in each of the edge position correction units 8 and 9 and each of the uplift prevention units 10 and 11 was set to 2 mm. Other conditions were similar to those of Invention Example 1 in the aforementioned Example 1.

In Example 2, Invention Examples 2 and 3 were performed to compare with Invention Example 1. In Invention Example 2, after performing the punching process of Invention Example 1, a device corresponding to the laminated core manufacturing device 1 used in Invention Example 1 with the edge position correction unit 8 being removed therefrom (hereinafter referred to as the laminated core manufacturing device of Invention Example 2) was prepared, and the laminated core manufacturing device of Invention Example 2 continuously performed the punching process of the steel sheets 15-1 and 15-2. In Invention Example 3, after performing the punching process of Invention Example 2, a device corresponding to the laminated core manufacturing device of Invention Example 2 with the edge position correction unit 9 being removed therefrom and the edge position correction unit 8 being attached thereto (hereinafter referred to as the laminated core manufacturing device of Invention Example 3) was prepared, and the laminated core manufacturing device of Invention Example 3 continuously performed the punching process of the steel sheets 15-1 and 15-2. This laminated core manufacturing device of Invention Example 3 corresponds to the laminated core manufacturing device 1 (see FIGS. 1 and 2) of Invention Example 1 with the edge position correction unit 9 being removed therefrom.

Conditions in Invention Example 2 were similar to those in Invention Example 1 of Example 2 except that the edge aligning process of the steel sheets 15-1 and 15-2 was not performed at the position just before the inlet of the pinch roller 12. Conditions in Invention Example 3 were similar to those in Invention Example 1 of Example 2 except that the edge aligning process of the steel sheets 15-1 and 15-2 was not performed at the position just behind the outlet of the pinch roller 12.

In Example 2, for each of Invention Examples 1 to 3, on completing the punching process of two overlapped steel sheets 15-1 and 15-2 for consecutive 2000 strokes at a stroke rate of 200 spm, measured was an amount of shift of edge positions in the width direction D1 of the steel sheets 15-1 and 15-2 positioned just before the die of the pressing machine 13 (that is, an amount of shift ΔW of the edge positions). Based on the obtained measurement results, the degree of the amount of shift ΔW of the edge positions due to a difference in installation positions of the edge position correction units 8 and 9 was evaluated.

Figure 9:
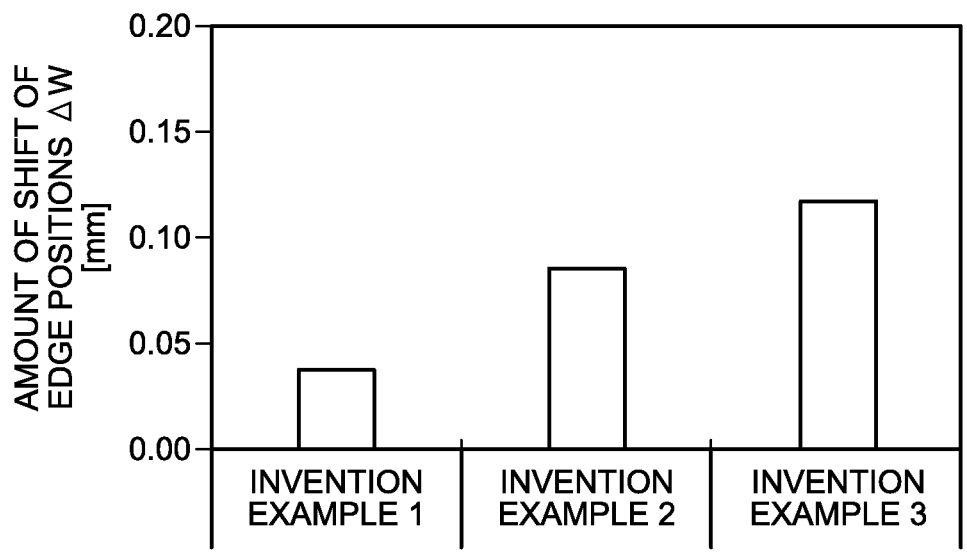
FIG. 9 is a view illustrating evaluation results in Example 2 of the present invention regarding an amount of shift of edge positions of punched steel sheets that are positioned just before a die.

FIG. 9 is a view illustrating the evaluation results in Example 2 of the present invention regarding the amount of shift of the edge positions of the punched steel sheets that are positioned just before the die. As illustrated in FIG. 9, in each of Invention Examples 1 to 3, the amount of shift ΔW of the edge positions of the steel sheets 15-1 and 15-2 was small, causing no trouble to disable the punching process. In particular, as illustrated in FIG. 9, comparing Invention Examples 1 to 3 in regard to the amount of shift ΔW of the edge positions, the amount of shift ΔW of the edge positions was found to be smaller in Invention Example 1 than in Invention Examples 2 and 3. This result shows that it is preferable to install the edge position correction units in the laminated core manufacturing device at both positions just before the inlet and just behind the outlet of the pinch roller 12.

As described above, according to aspects of the present invention, a punched out body of a plurality of laminated core materials used for manufacturing a laminated core is at least manufactured in at least one of the preceding stage and the subsequent stage of the overlapping unit configured to overlap the plurality of laminated core materials conveyed along different conveyance routes by performing the following processes: the edge aligning process to align edge positions and to correct, between the laminated core materials, shift of each edge position of the plurality of laminated core materials with respect to a standard edge position; and the uplift prevention process to prevent uplift of the plurality of laminated core materials in which the edge positions are aligned and shift of the edge positions is corrected by the edge aligning process, and an overlapped body of the plurality of laminated core materials subjected to the edge aligning process and the uplift prevention process is simultaneously punched out into a target core shape.

Therefore, without detecting each edge position of the plurality of laminated core materials with a detection device, it is possible to correct the edge positions of the plurality of laminated core materials to positions suitable for feeding the laminated core materials into the die of the pressing machine with a simple device structure, while aligning the edge positions between the laminated core materials, what is more, it is possible to prevent uplift of each laminated core material. Accordingly, it is possible to suppress, to the extent possible, shift of the edge positions and uplift of the plurality of laminated core materials overlapped and punched out to manufacture a laminated core, while maintaining each edge position in a state of alignment between the laminated core materials. Thus, it is possible to stably supply the overlapped body of the plurality of laminated core materials, whose edge positions are aligned between the laminated core materials, into a punching operation to manufacture a laminated core, while reducing installation costs and running costs of devices and reducing time and effort required for maintenance of the devices.

According to aspects of the present invention, it is possible to stably and sequentially feed the overlapped body of the plurality of laminated core materials into the die of the punching unit (pressing machine), while maintaining the edge positions in a state of alignment between the laminated core materials setting each edge position of the laminated core materials close to (desirably, make the same corresponding to) the standard edge position. Thus, it is possible to prevent troubles due to shift in the width direction of the laminated core materials such as contact between the die and the overlapped body, and troubles such as clogging due to uplift of the laminated core materials inside the die, and it is possible to stably manufacture a desired laminated core by continuously punching out a punched out body. When simultaneously punching out the overlapped body of the plurality of laminated core materials, it is possible to suppress shift of the edge positions between the laminated core materials forming the overlapped body, which makes it possible to prevent troubles of the punching process attributed to the shift in the edge positions between the laminated core materials, thereby improving the production efficiency of manufacturing a laminated core. Furthermore, it is possible to manufacture a laminated core using a thinner laminated core material (for example, a thin electrical steel sheet) with high production efficiency, thereby providing an excellent laminated core with low energy loss.

Still further, in accordance with aspects of the present invention, the edge position correction unit is installed just before, or just behind the overlapping unit that overlaps the plurality of laminated core materials, or plurally installed just before the inlet and just behind the outlet of the overlapping unit so as to align the edge positions and to correct shift of the edge positions of the plurality of laminated core materials between the laminated core materials. This makes it possible to further reduce the amount of shift of each edge position of the overlapped laminated core materials at the position just before the die of the pressing machine, and it is possible to further reduce the amount of uplift of each laminated core material inside the die. Thus, it is possible to feed the overlapped body of the plurality of laminated core materials into the die of the pressing machine with more stability.

It should be noted that the present invention is not limited to the aforementioned embodiment and Examples. Structures with appropriate combinations of the aforementioned components are also incorporated in accordance with aspects of the present invention. The shape and uses of the laminated core manufactured in accordance with aspects of the present invention are not particularly limited. Other embodiments, Examples, operation techniques, and the like that are to be performed by those skilled in the art based on the aforementioned embodiment and Examples are all included in the scope of aspects of the present invention.

INDUSTRIAL APPLICABILITY

In such manners, a laminated core manufacturing device and a laminated core manufacturing method according to an embodiment of the present invention are useful for manufacturing at least a laminated core of a plurality of laminated core materials used for manufacturing a laminated core, particularly, suitable for a laminated core manufacturing device and a laminated core manufacturing method capable of suppressing, to the extent possible, shift of edge positions and uplift of the plurality of laminated core materials overlapped and punched out to manufacture a laminated core.

REFERENCE SIGNS LIST

1 LAMINATED CORE MANUFACTURING DEVICE
2-1 to 2-n DISCHARGING UNIT
3-1 to 3-n, 4-1 to 4-n, 5a to 5e FEED ROLLER
5 FEED ROLLER GROUP
8, 9 EDGE POSITION CORRECTION UNIT
10, 11 UPLIFT PREVENTION UNIT
12 PINCH ROLLER
13 PRESSING MACHINE
13a UPPER DIE
13b LOWER DIE
15 PLURALITY OF STEEL SHEETS
15-1 to 15-n STEEL SHEET
18 OVERLAPPED BODY
21a, 21b SIDE GUIDE ROLLER
22a, 22b ROLLER STAGE
23a, 23b SPRING
24a, 24b WHEEL
25 BASEMENT

25a RAIL
D1 WIDTH DIRECTION
D2 LONGITUDINAL DIRECTION
D3 THICKNESS DIRECTION
Pa, Pb EDGE POSITION
SPa, SPb STANDARD EDGE POSITION

The invention claimed is:

1. A laminated core manufacturing apparatus for manufacturing at least a punched out body of a plurality of laminated core materials used for manufacturing a laminated core, the laminated core manufacturing apparatus comprising:
- an overlapping unit configured to overlap the plurality of laminated core materials conveyed along different conveyance routes;
- an edge position correction unit configured to align edge positions in a width direction of the plurality of laminated core materials between the plurality of laminated core materials and to correct shift of each edge position of the plurality of laminated core materials with respect to a standard edge position which is a reference of each edge position in the width direction;
- an uplift prevention unit configured to prevent uplift of the plurality of laminated core materials in which the edge positions are aligned and shift of the edge positions is corrected by the edge position correction unit; and
- a punching unit configured to punch out the plurality of laminated core materials which are overlapped by the overlapping unit and have been subjected to a process to align the edge positions and to correct shift of the edge positions performed by the edge position correction unit, and a process to prevent the uplift performed by the uplift prevention unit, so as to obtain the punched out body, wherein the edge position correction unit includes:
- a pair of side guide rollers facing each other in the width direction of the plurality of laminated core materials; and
- a pair of springs configured to generate elastic force to bias the pair of side guide rollers in a facing direction when the pair of side guide rollers separates from each other and exceeds a reference interval between the pair of side guide rollers, wherein the pair of side guide rollers sandwiches the plurality of laminated core materials in the width direction by the elastic force of the pair of springs so as to align the edge positions and to correct shift of the edge positions.

2. The laminated core manufacturing apparatus according to claim 1, wherein the uplift prevention unit is installed on an upper part of the edge position correction unit so as to close an upper side of the edge position correction unit.

3. The laminated core manufacturing apparatus according to claim 1, wherein the edge position correction unit is installed just before an inlet of the overlapping unit or just behind an outlet of the overlapping unit.

4. The laminated core manufacturing apparatus according to claim 3, further comprising an additional edge position correction unit configured to align edge positions in a width direction of the plurality of laminated core materials between the plurality of laminated core materials and to correct shift of each edge position of the plurality of laminated core materials with respect to a standard edge position which is a reference of each edge position in the width direction, wherein
- when the edge position correction unit is installed just before the inlet of the overlapping unit, the additional edge position correction unit is installed just behind the outlet of the overlapping unit; and
- when the edge position correction unit is installed just behind the outlet of the overlapping unit, the additional edge position correction unit is installed just before the inlet of the overlapping unit.

5. A laminated core manufacturing method for manufacturing at least a punched out body of a plurality of laminated core materials used for manufacturing a laminated core, the laminated core manufacturing method comprising:
- an overlapping step of overlapping the plurality of laminated core materials conveyed along different conveyance routes;
- an edge position correction step of aligning with an edge position correction unit edge positions in a width direction of the plurality of laminated core materials between the plurality of laminated core materials and to correct shift of each edge position of the plurality of laminated core materials with respect to a standard edge position which is a reference of each edge position in the width direction;
- an uplift prevention step of preventing uplift of the plurality of laminated core materials in which the edge positions are aligned and shift of the edge positions is corrected by the edge position correction step; and
- a punching step of punching out the plurality of laminated core materials which have been overlapped by the overlapping step, and subjected to a process to align the edge positions and to correct shift of the edge positions in the edge position correction step, and a process to prevent the uplift in the uplift prevention step, so as to obtain the punched out body, wherein the edge position correction unit includes:
- a pair of side guide rollers facing each other in the width direction of the plurality of laminated core materials; and
- a pair of springs configured to generate elastic force to bias the pair of side guide rollers in a facing direction when the pair of side guide rollers separates from each other and exceeds a reference interval between the pair of side guide rollers, wherein in the edge position correction step, the pair of side guide rollers sandwiches the plurality of laminated core materials in the width direction by the elastic force of the pair of springs so as to align the edge positions and to correct shift of the edge positions.

* * * * *